(12) United States Patent
Chapman

(10) Patent No.: US 8,193,788 B2
(45) Date of Patent: *Jun. 5, 2012

(54) METHOD AND DEVICE FOR CONTROLLING A CONFIGURABLE POWER SUPPLY TO PROVIDE AC AND/OR DC POWER OUTPUT

(75) Inventor: Patrick Chapman, Austin, TX (US)

(73) Assignee: SolarBridge Technologies, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,176

(22) Filed: Jul. 11, 2011

(65) Prior Publication Data

US 2011/0267859 A1 Nov. 3, 2011

Related U.S. Application Data

(60) Provisional application No. 61/479,844, filed on Apr. 27, 2011.

(51) Int. Cl.
G05F 1/24 (2006.01)
(52) U.S. Cl. .................. 323/259; 323/906; 363/65
(58) Field of Classification Search .................. 323/906, 323/322, 323, 344, 259, 351; 363/1, 65; 307/131

See application file for complete search history.

(56) References Cited

U.S. PATENT DOCUMENTS

| | | | |
|---|---|---|---|
| 3,670,230 A | 6/1972 | Rooney et al. | |
| 4,114,048 A | 9/1978 | Hull | |
| 4,217,633 A | 8/1980 | Evans | |
| 4,277,692 A | 7/1981 | Small | |
| 4,287,465 A | 9/1981 | Godard et al. | |
| 4,651,265 A | 3/1987 | Stacey et al. | |
| 4,661,758 A | 4/1987 | Whittaker | |
| 4,707,774 A | 11/1987 | Kajita | |
| 4,709,318 A | 11/1987 | Gephart et al. | |
| 4,719,550 A | 1/1988 | Powell et al. | |
| 4,725,740 A | 2/1988 | Nakata | |
| 5,041,959 A | 8/1991 | Walker | |
| 5,148,043 A | 9/1992 | Hirata et al. | |
| 5,160,851 A | 11/1992 | McAndrews | |

(Continued)

FOREIGN PATENT DOCUMENTS

CA 2353422 C 3/2004

(Continued)

OTHER PUBLICATIONS

Kutkut, "PV Energy Conversion and System Integration," Florida Energy Systems Consortium, 2009, 24 pages.

(Continued)

*Primary Examiner* — Harry Behm
*Assistant Examiner* — Matthew Grubb
(74) *Attorney, Agent, or Firm* — Barnes & Thornburg LLP

(57) ABSTRACT

An apparatus, device, and system for generating an amount of output power in response to a direct current (DC) power input includes a configurable power supply, which may be electrically coupled to the DC power input. The configurable power supply is selectively configurable between multiple circuit topologies to generate various DC power outputs and/or and AC power output. The system may also include one or more DC power electronic accessories, such as DC-to-DC power converters, and/or one or more AC power electronic accessories such as DC-to-AC power converters. The power electronic accessories are couplable to the configurable power supply to receive the corresponding DC or AC power output of the configurable power supply.

20 Claims, 22 Drawing Sheets

U.S. PATENT DOCUMENTS

| | | |
|---|---|---|
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,809,942 B2 | 10/2004 | Madenokouji |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,126,294 B2 | 10/2006 | Minami |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,710,752 B2 | 5/2010 | West |
| 7,733,679 B2 | 6/2010 | Luger et al. |
| 7,768,155 B2 | 8/2010 | Fornage |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,899,632 B2 | 3/2011 | Fornage et al. |
| 7,916,505 B2 | 3/2011 | Fornage |
| 2001/0043050 A1 | 11/2001 | Fisher |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2006/0067137 A1 | 3/2006 | Udrea |
| 2006/0083039 A1 | 4/2006 | Oliveira |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055940 A1* | 3/2008 | Lawson et al. ............... 363/16 |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1* | 4/2009 | Fornage et al. ............. 136/244 |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0139945 A1 | 6/2010 | Dargatz |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |
| 2011/0051820 A1 | 3/2011 | Fornage |
| 2011/0130889 A1 | 6/2011 | Khajehoddin et al. |

FOREIGN PATENT DOCUMENTS

| | | | |
|---|---|---|---|
| CA | 2655007 A1 | 8/2010 | |
| CA | 2693737 A1 | 8/2010 | |
| DE | 20012131 U1 | 3/2001 | |
| EP | 1837985 A2 | 9/2007 | |
| GB | 2419968 A | 5/2006 | |
| GB | 2421847 A | 7/2006 | |
| GB | 2439648 A | 1/2008 | |
| GB | 2434490 B | 4/2009 | |

| | | | |
|---|---|---|---|
| GB | 2454389 A | 5/2009 | |
| GB | 2455753 A | 6/2009 | |
| GB | 2455755 A | 6/2009 | |
| NL | 1021582 C2 | 6/2004 | |
| NL | 1021591 C2 | 6/2004 | |
| WO | WO 2004008619 A2 | 1/2004 | |
| WO | WO 2004100348 A1 | 11/2004 | |
| WO | WO 2004100348 A8 | 12/2005 | |
| WO | WO 2006048688 A1 | 5/2006 | |
| WO | WO 2007080429 A2 | 7/2007 | |
| WO | WO 2009081205 A2 | 7/2009 | |
| WO | WO 2009081205 A3 | 10/2009 | |
| WO | WO 2009134756 A1 | 11/2009 | |

OTHER PUBLICATIONS

Kwon et al., "High-efficiency Module-integrated Photovoltaic Power Conditioning System," IET Power Electronics, doi: 10.1049/iet-pel.2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995—Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter", in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the Photoenergy™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

* cited by examiner

METHOD AND DEVICE FOR CONTROLLING A CONFIGURABLE POWER SUPPLY TO PROVIDE AC AND/OR DC POWER OUTPUT

CROSS-REFERENCE TO RELATED U.S. PATENT APPLICATION

The present application claims priority under 35 U.S.C. §119(e) to U.S. Provisional Patent Application Ser. No. 61/479,844, entitled "MODULAR PHOTOVOLTAIC POWER SUPPLY ASSEMBLY" by Patrick Chapman, which was filed on Apr. 27, 2011.

Cross-reference is also made to U.S. Utility patent application Ser. No. 13/180,170 entitled "CONFIGURABLE POWER SUPPLY ASSEMBLY" by Patrick Chapman, which was filed on Jul. 11, 2011 and to U.S. Utility patent application Ser. No. 13/180,168 entitled "MODULAR PHOTOVOLTAIC POWER SUPPLY ASSEMBLY" by Patrick Chapman et al., which was filed on Jul. 11, 2011.

TECHNICAL FIELD

The present disclosure relates, generally, to photovoltaic (PV) modules and associated power electronic devices, and more particularly, to power converters for converting direct current (DC) power generated by PV modules to DC or alternating current (AC) power.

BACKGROUND

Photovoltaic (PV) modules typically include a large number of individual solar cells that each generate a small amount of DC power at very low voltage levels. As such, the individual solar cells are electrically connected together in serial strings of solar cells such that the PV module, as a whole, generates DC power at a low voltage level (e.g., about 25 volts). For example, as shown in FIG. 22, a typical photovoltaic module 2200 includes a housing 2202 and a plurality of solar cells 2204 defined on a front side 2206 of the housing 2202. To allow interconnection of the photovoltaic module 2200 with other modules 2200, typical photovoltaic modules 2200 include a junction box 2300 located on a back side 2208 of the housing 2202 as shown in FIG. 20. The junction box 2300 typically houses a simplistic, passive connection circuit 2302 that facilitates the interconnection of multiple photovoltaic modules 2200 in a parallel or serial configuration. A typical passive connection circuit 2302 includes a pair of bypass diodes, which provide an alternate current path through the photovoltaic module 2200 should one of the solar cell strings of the module 2200 become damaged, shaded, or otherwise inoperable. A pair of output wires 2304 extend from the junction box 2300 and allow the photovoltaic module 2200 to be coupled with other modules 2200 or with other electronic devices.

One example of an electronic device that may be attached to the photovoltaic module is a microinverter. Microinverters convert the DC power generated by the associated individual photovoltaic module 2200 into an AC power suitable for supplying energy to an AC grid and/or an AC load coupled to the AC grid. Microinverters may be coupled directly to the housing 2202 of the photovoltaic module 2200 via screws, adhesive, or other securing devices. Alternatively, microinverters may be coupled directly to the junction box 2300. The output wires 2304 of the photovoltaic module 2200 are electrically coupled to input connections of the microinverter. The output of the microinverter may be coupled to the outputs of other microinverters of a string of PV modules 2200.

SUMMARY

According to one aspect, a method for controlling a configurable power supply may include determining whether a direct current (DC) electric accessory has been electrically connected to the configurable power supply. The method may also include determining whether an alternating current (AC) electric accessory has been inductively coupled to the configurable power supply. Additionally, the method may include modifying a circuit topology of the configurable power supply to a first circuit topology to generate a DC power output to the DC electric accessory in response to determining that the DC electric accessory has been electrically connected. The method may also include modifying the circuit topology of the configurable power supply to a second circuit topology to generate an AC power output to the AC electric accessory in response to determining that the AC electric accessory has been inductively coupled to the configurable power supply.

In some embodiments, determining whether the DC electric accessory has been electrically connected to the configurable power supply may include sensing a DC output current at a DC output of the configurable power supply. Additionally, in some embodiments, determining whether the DC electric accessory has been electrically connected to the configurable power supply may include receiving a control signal indicating that the DC electric accessory has been electrically connected to the configurable power supply. Additionally, determining whether the DC electric accessory has been electrically connected to the configurable power supply may include determining a state of a physical switch.

In some embodiments, determining whether the AC electric accessory has been electrically connected to the configurable power supply may include sensing an AC output current at an AC output of the configurable power supply. Additionally, in some embodiments, determining whether the AC electric accessory has been electrically connected to the configurable power supply may include determining whether a primary coil of the configurable power supply is inductively coupled to a secondary coil of an internal electronic circuit of the AC electric accessory. Furthermore, modifying the circuit topology of the configurable power supply may include controlling a state of an electronic switch of the configurable power supply.

Additionally, in some embodiments, modifying the circuit topology of the configurable power supply may include controlling a state of a plurality of electronic switches of an H-bridge of the configurable power supply. Additionally, modifying the circuit topology of the configurable power supply may include controlling a state of a plurality of electronic switches of an H-bridge of the configurable power supply. Additionally, in some embodiments, modifying the circuit topology of the configurable power supply to the first circuit topology may include modifying the circuit topology of the configurable power supply to form a buck boost converter. Modifying the circuit topology of the configurable power supply to the second circuit topology may include modifying the circuit topology of the configurable power supply to form a DC-AC inverter circuit. Further, in some embodiments, modifying the circuit topology of the configurable power supply to the second circuit topology may include modifying the circuit topology to a third circuit topology to form a pass-through circuit to pass a DC power input received by the configurable power supply to a DC output of the configurable power supply with substantially no processing.

According to another aspect, a configurable power supply may include an input converter having an input to receive a direct current (DC) power input, and an input controller electrically connected to the input converter. The input converter may be selectively configurable between a first circuit topology to generate a DC power output and a second circuit topology to generate an AC power output based on a control signal. The input controller may include a processor and a memory. The memory may include a plurality of instructions, which when executed by the processor, cause the input controller to determine (i) whether a direct current (DC) electric accessory has been electrically connected to the input converter and (ii) whether an alternating current (AC) electric accessory has been inductively coupled to the input converter. Further, the plurality of instructions, which when executed by the processor, may cause the input controller to modify the circuit topology of the input converter to the first circuit topology in response to determining that the DC electric accessory has been electrically connected to the input converter. Yet further, the plurality of instructions, which when executed by the processor, may cause the input controller to modify the circuit topology of the input converter to the second circuit topology in response to determining that the AC electric accessory has been inductively coupled to the input converter.

In some embodiments, determining whether the DC electric accessory has been electrically connected to the input converter may include to determining whether a sensed DC output current of the input converter is above a predetermined threshold value. Additionally, in some embodiments, determining whether the DC electric accessory has been electrically connected to the input converter may include determining a state of a physical switch. In some embodiments, determining whether the AC electric accessory has been electrically connected to the input converter may include determining whether a sensed AC output current of the input converter is above a predetermined threshold value.

In some embodiments, determining whether the AC electric accessory has been electrically connected to the input converter may include determining whether a primary coil of the input converter is inductively coupled to a secondary coil of an internal electronic circuit of the AC electric accessory. Additionally, in some embodiments, modifying the circuit topology of the input converter may include controlling a state of an electronic switch of the input converter.

In some embodiments, modifying the circuit topology of the input converter to the first circuit topology may include modifying the circuit topology of the input converter to form a buck-boost converter. Additionally, modifying the circuit topology of the configurable power supply to the second circuit topology may include modifying the circuit topology of the input converter to form a DC-AC inverter circuit. In such embodiments, the plurality of instructions, which when executed by the processor, may further cause the input controller to modify the circuit topology of the input converter to a third circuit topology to form a pass-through circuit to pass the DC power input to a DC output of the configurable power supply with substantially no processing.

According to a further aspect, a method for controlling a configurable power supply may include determining (i) whether a direct current (DC) electric accessory has been electrically connected to the configurable power supply and (ii) whether an alternating current (AC) electric accessory has been inductively coupled to the configurable power supply.

Additionally, the method may include modifying a circuit topology of the configurable power supply to form a buck-boost DC converter to deliver an amount of DC power to the DC electric accessory in response to determining that the DC electric accessory has been electrically connected. Further, the method may include modifying the circuit topology of the configurable power supply to form a DC-AC inverter circuit to deliver an amount of AC power to the AC electric accessory in response to determining that the AC electric accessory has been inductively coupled to the configurable power supply.

In some embodiments, the method for controlling a configurable power supply may include modifying the circuit topology of the configurable power supply to form a DC pass-through circuit based on a state of an electronic switch in response to determining that the DC electric accessory has been electrically connected.

DETAILED DESCRIPTION

Figure 1:
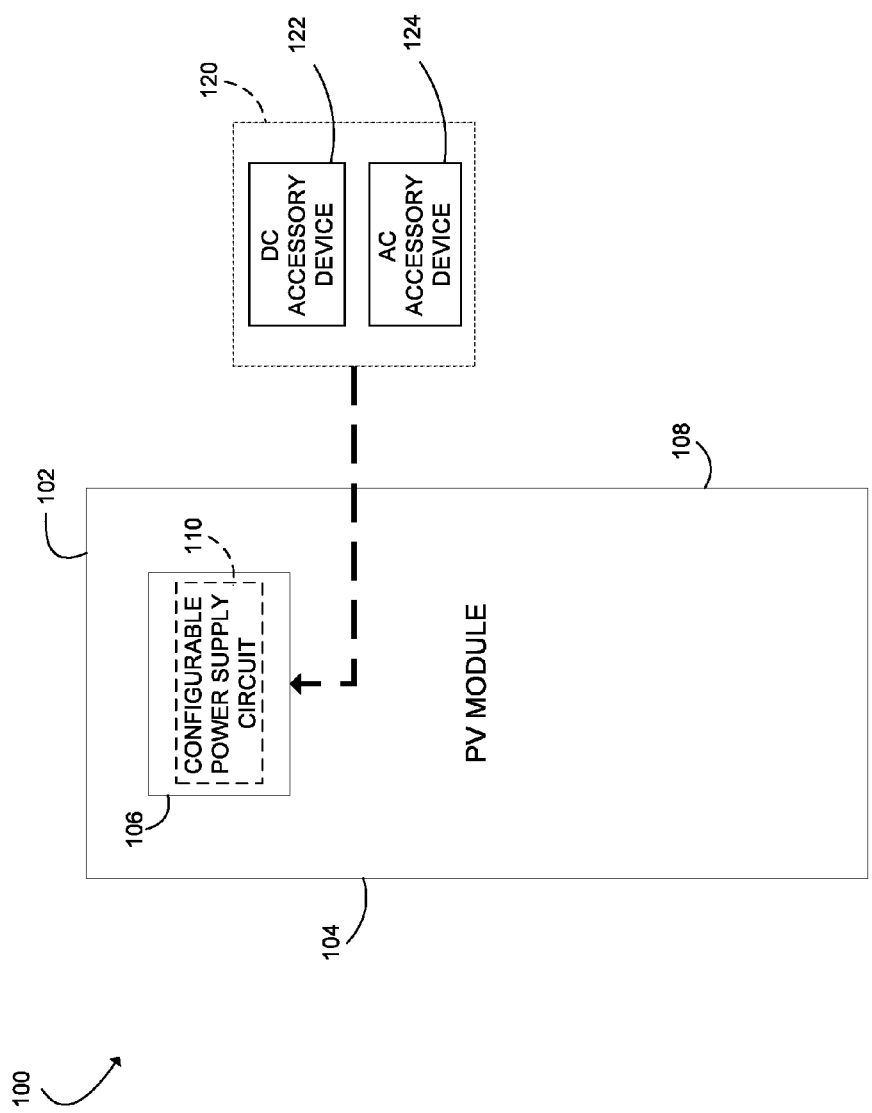
FIG. 1 is a simplified block diagram of one embodiment of a modular photovoltaic (PV) power supply assembly.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a modular photovoltaic (PV) power supply assembly 100 includes a PV module 102 having a housing 104 and a junction box 106 attached to the housing 104. Illustratively, the junction box 106 is attached to a rear side 108 of the housing 104 but may be attached to other areas of the housing 104 in other embodiments. The PV power supply assembly 100 also includes a configurable power supply circuit 110 located in the junction box 106. Unlike the passive circuits located in junction boxes of typical photovoltaic modules, the configurable power supply circuit 110 is an active circuit configurable to generate a DC or AC power output as discussed in more detail below.

In some embodiments, the modular PV power supply assembly 100 may also include one or more electronic accessory devices 120, which may be embodied as a DC electronic accessory devices 122 (i.e., an electronic accessory configured to receive a DC power output from the configurable power supply circuit 110), an AC electronic accessory device 124 (i.e., an electronic accessory configured to receive a AC power output from the configurable power supply circuit 110), or other electronic devices. As discussed in more detail below, the accessory devices 120 are configured to connect or otherwise couple with the junction box 106 to receive a DC and/or AC power output therefrom. The accessory devices 120 include internal circuitry that becomes electrically or inductively coupled to the configurable power supply circuit 110 when the accessory device is connected to the junction box 106. In this way, a new or complete electronic circuit may be formed by electrically coupling of the configurable power supply circuit 110 and the internal circuitry of the accessory device 120. The DC electronic accessory device 122 may be embodied as any type of electronic device couplable to the junction box 106 and configured to receive a DC power output therefrom such as, for example, a low voltage DC-to-DC power converter, a high voltage DC-to-DC power converter, a DC power optimizer, or the like. Similarly, the AC electronic accessory device 124 may be embodied as any type of electronic device couplable to the junction box 106 and configured to inductively couple to the configurable power supply circuit 110 to receive an AC power output therefrom such as, for example, a single phase AC-to-AC power converter (e.g., to form a single phase DC-to-AC converter when coupled with the configurable power supply to circuit 110), a three phase AC-to-AC power converter (e.g., to form a single phase DC-to-AC converter when coupled with the configurable power supply to circuit 110), an AC-to-DC converter (e.g., to form a DC-to-DC converter when coupled with the configurable power supply circuit 110), or the like. Of course, in some embodiments, the modular PV power supply assembly 100 may not include any electronic accessory devices 120 as discussed in more detail below.

Figure 2:
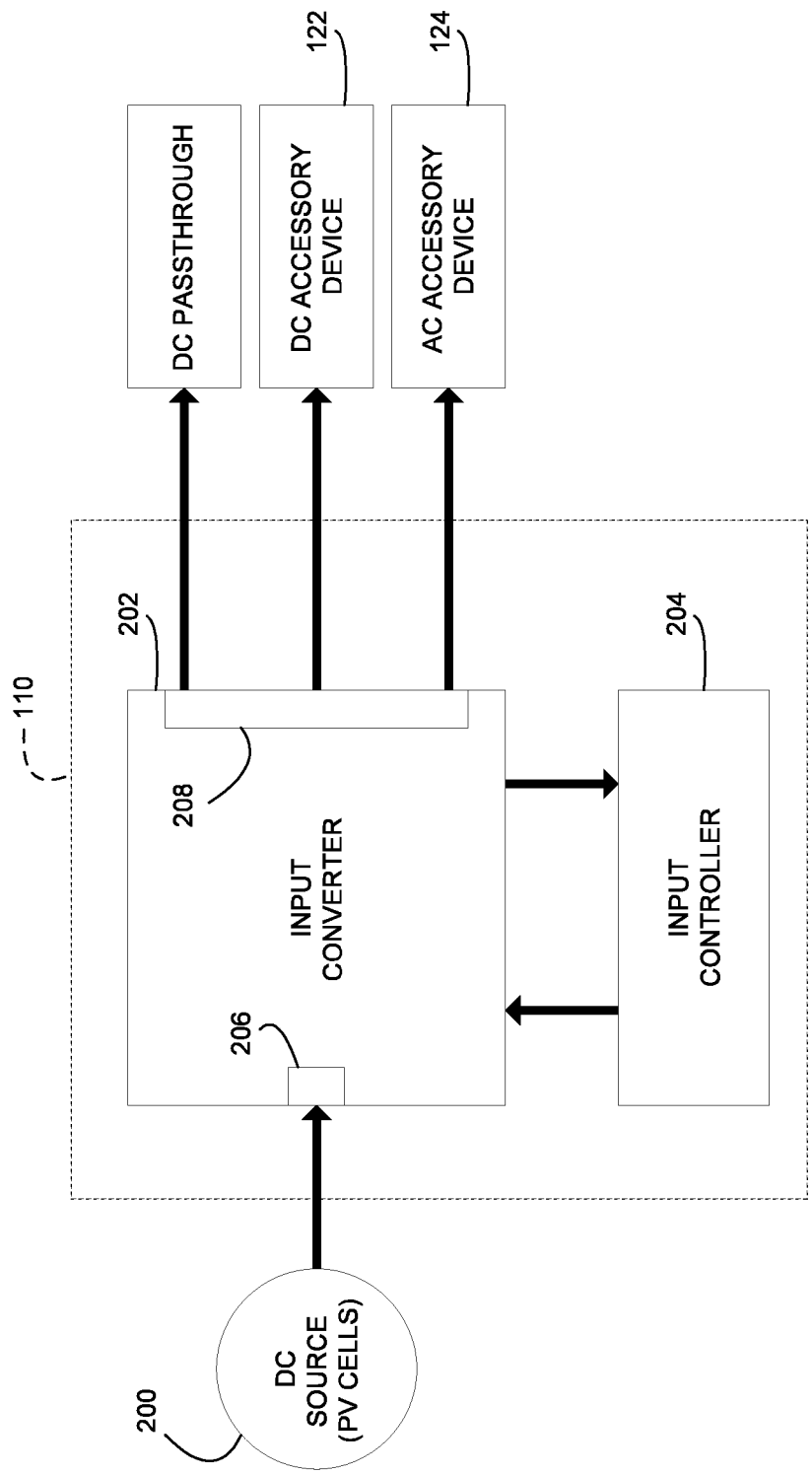
FIG. 2 is a simplified block diagram of one embodiment of a configurable power supply of the modular photovoltaic power supply assembly of FIG. 1.

Referring now to FIG. 2, in one embodiment, the configurable power supply circuit 110 includes an input converter 202 and an input controller 204 electrically coupled to the input converter 202 and configured to control the operation of the input converter 202 as discussed below. The input converter 202 includes a DC input 206 electrically coupled to the DC source 200 of the PV module 102 (i.e., to the output of the solar cells of the PV module 102) to receive a DC power input signal therefrom and generate a power output based on an internal circuit topology of the input converter 202. That is, as discussed in more detail below, the input converter 202 is configurable to one of a plurality of circuit topologies or configurations based on, for example, the desired type of output of the input converter 202 or the type of electronic accessory device 120 to be used with the configurable power supply circuit 110. In some embodiments, the circuit topology of the input converter 202 is manually configurable (e.g., via a manually selectable switch). Alternatively, in other embodiments, the input controller 204 is configured to control the circuit topology of the input converter 202 via use of one or more control signals as discussed in more detail below.

Depending on the particular circuit topology selected for the input converter 202, the input converter 202 may generate a DC power "pass through" output in which the DC power input signal generated by the DC source 200 is passed through the input converter 202 with minimal or no processing, a processed (e.g., boosted) DC power output for supplying power to one of the DC electronic accessory devices 122, or an "AC power output" for inductively coupling to and supplying power to one of the AC electronic accessory devices 124. It should be appreciated, as discussed in more detail below, the "AC power output" of the input converter may be embodied as or otherwise produce an electromagnetic field for inductively coupling a secondary coil of the corresponding AC electronic accessory device 124.

Figure 3:
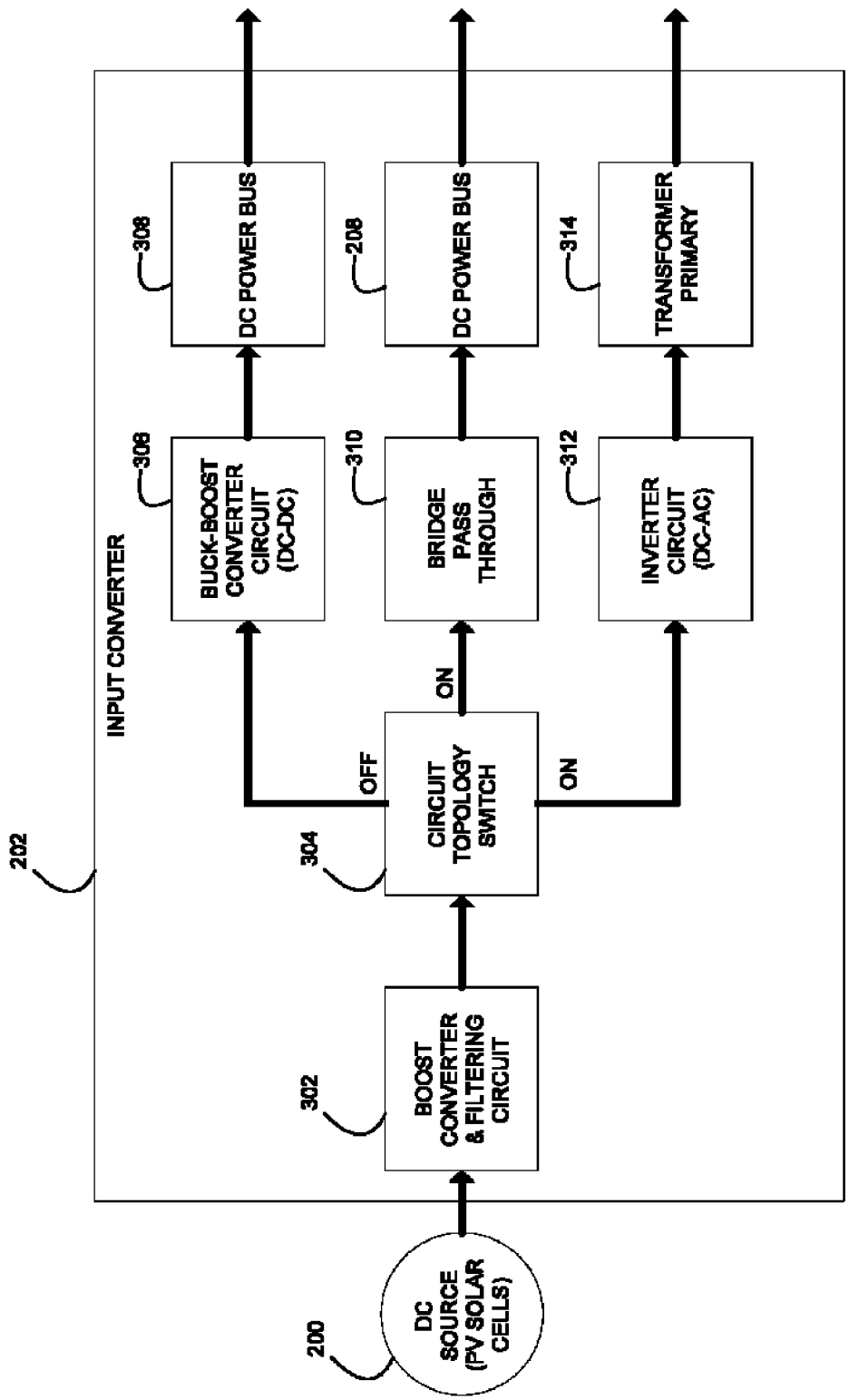
FIG. 3 is a simplified block diagram of one embodiment of an input converter of the configurable power supply of FIG. 2

Referring now to FIG. 3, in one embodiment, the input converter 202 includes a boost converter and filtering circuit 302, which is electrically coupled to the DC source 200. The input converter 202 also includes a circuit topology switch 304. Based on the state or position of the circuit topology switch 304, the circuit topology of the input converter 202 may be modified. The circuit topology switch 304 may be embodied as a physical switch, which may be manually controlled, or as a semiconductor switch such as a transistor (e.g., a metal-oxide-semiconductor field-effect transistor (MOSFET)). Depending on the state of the circuit topology switch 304 (i.e., whether the switch 304 is in an "on" state or an "off" state), the input converter 202 may be configured to include a buck-boost converter circuit 306 that supplies a DC power output to a DC power bus 308, a bridge pass-through circuit 310 that supplies a minimally processed DC power output to the DC power bus 308, or an inverter circuit 312 that supplies an AC power signal to a transformer primary 314.

Figure 4:
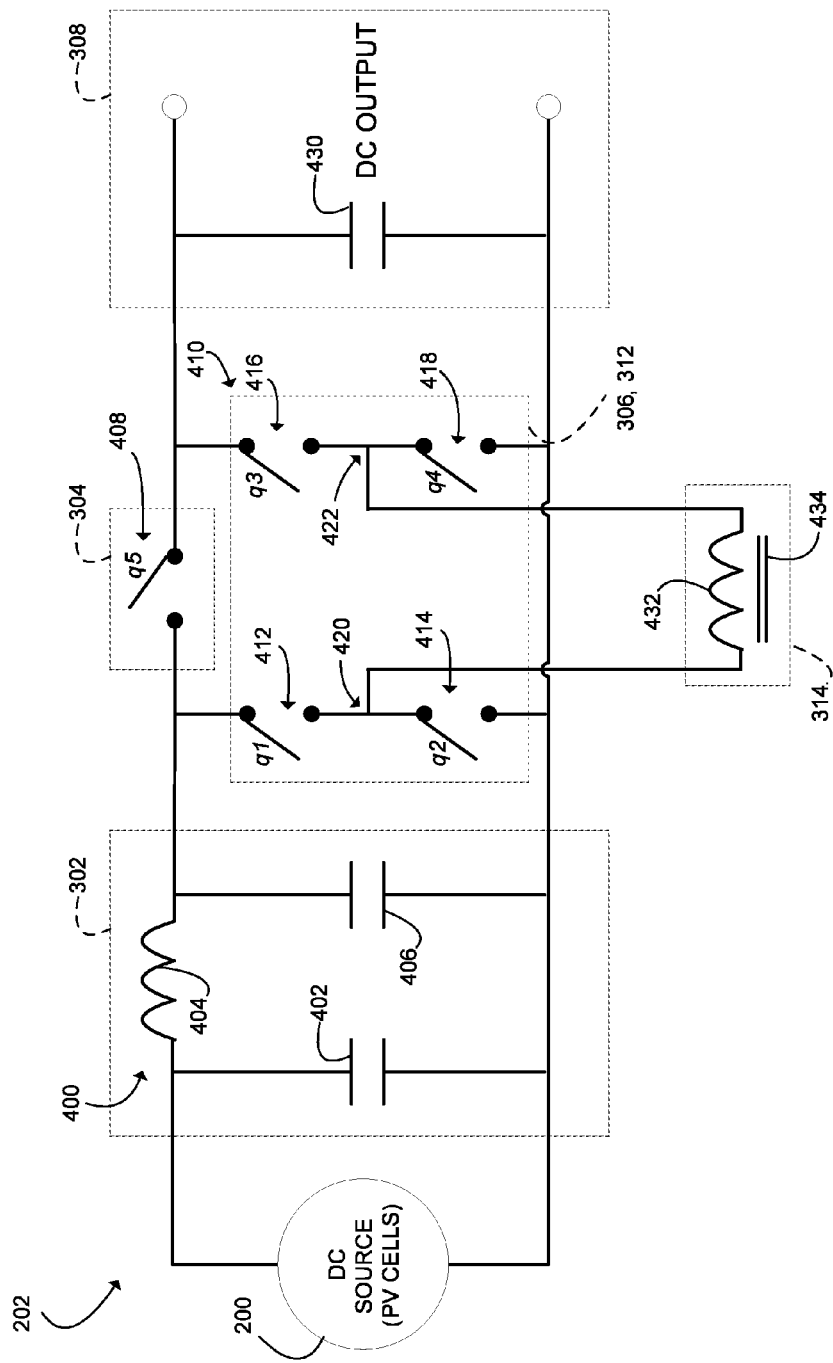
FIG. 4 is a simplified electrical schematic of one embodiment of the input converter of FIG. 3.

One illustrative embodiment of the input converter 202 is illustrated in FIG. 4. In the illustrative embodiment, the boost converter and filtering circuit 302 is embodied as a resonant circuit 400 including a capacitor 402, an inductor 404, and a capacitor 406. Of course, in other embodiments, other boosting and/or filtering circuits may be used. The circuit topology switch 304 is embodied as a semiconductor switch 408, such as a transistor. Additionally, the buck-boost converter circuit 306/inverter circuit 312 are formed from an H-bridge circuit 410. The H-bridge circuit 410 includes four semiconductor switches 412, 414, 416, and 418, which form individual "legs" of the H-bridge. The inductor/transformer primary 314 is coupled between a bridge node 420 (the connection point between the switches 412, 414) and a bridge node 422 (the connection point between the switches 416, 418). The states (on/off) of each of the semiconductor switches 412, 414, 416, 418, and 408 is controlled by corresponding control signals, q1, q2, q3, q4, and q5, which may be generated by the input controller 204.

The DC power bus 308 is illustratively embodied as a capacitor 430. In the illustrative embodiment, the capacitor 430 is embodied as a filter capacitor having a relatively small capacitance. However, in other embodiments, the capacitor 430 may be embodied as one or more capacitors having a large capacitance value and providing an amount of energy storage for the DC output of the configurable power supply circuit 110. In one illustrative embodiment, the capacitor 430 is embodied as one or more non-electrolytic capacitors such as one or more film capacitors. The illustrative transformer primary 314 includes a primary coil 432 and an associated core 434 (e.g., a ferrite core).

Figure 5:
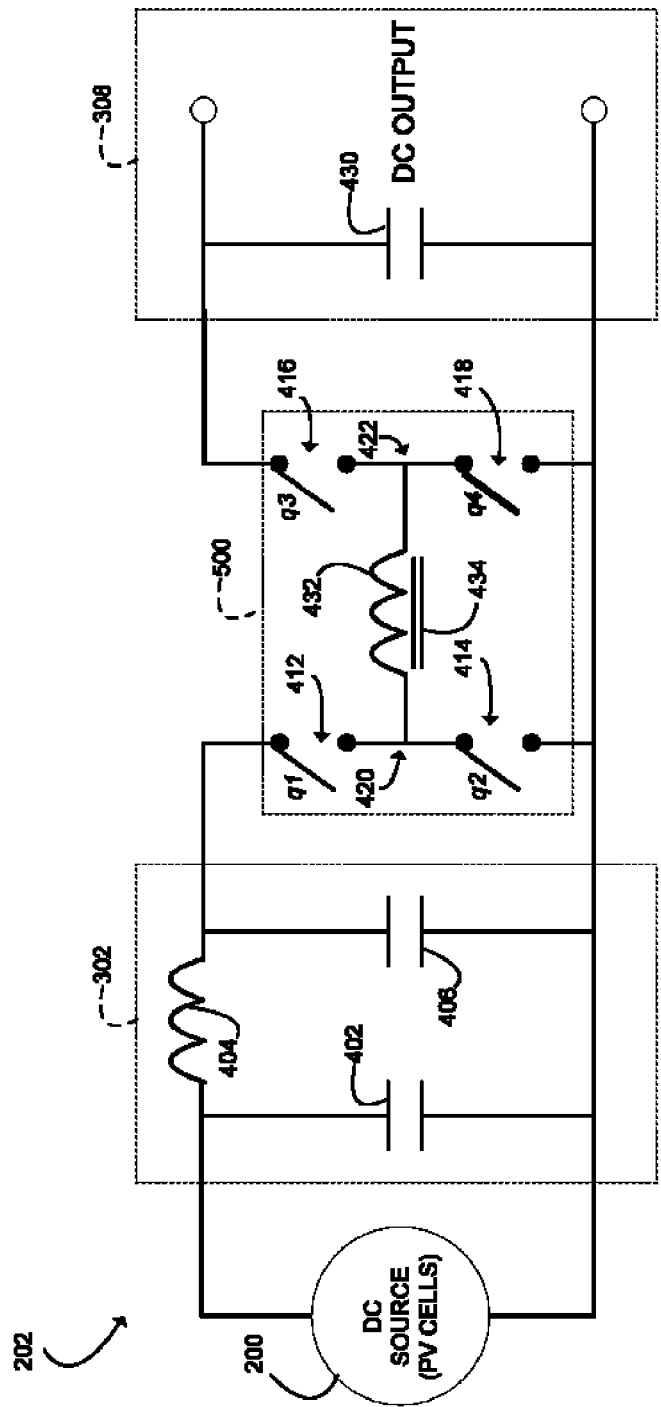
FIG. 5 is a simplified electrical schematic of the input converter of FIG. 4 configured to an illustrative circuit topology.

As discussed above, the state of the semiconductor switches 412, 414, 416, 418, and 408 controls the circuit topology of the input converter 202. For example, if the circuit topology switch 304 (i.e., semiconductor switch 408 in FIG. 4) is in the off state (i.e., opened), the semiconductor switches 412, 414, 416, 418 are configured as a buck-boost converter 500 as shown in FIG. 5 to provide a boosted or otherwise processed DC power to the DC power bus 308. In such a circuit topology, the transformer primary 314 forms a simple inductor.

Figure 6:
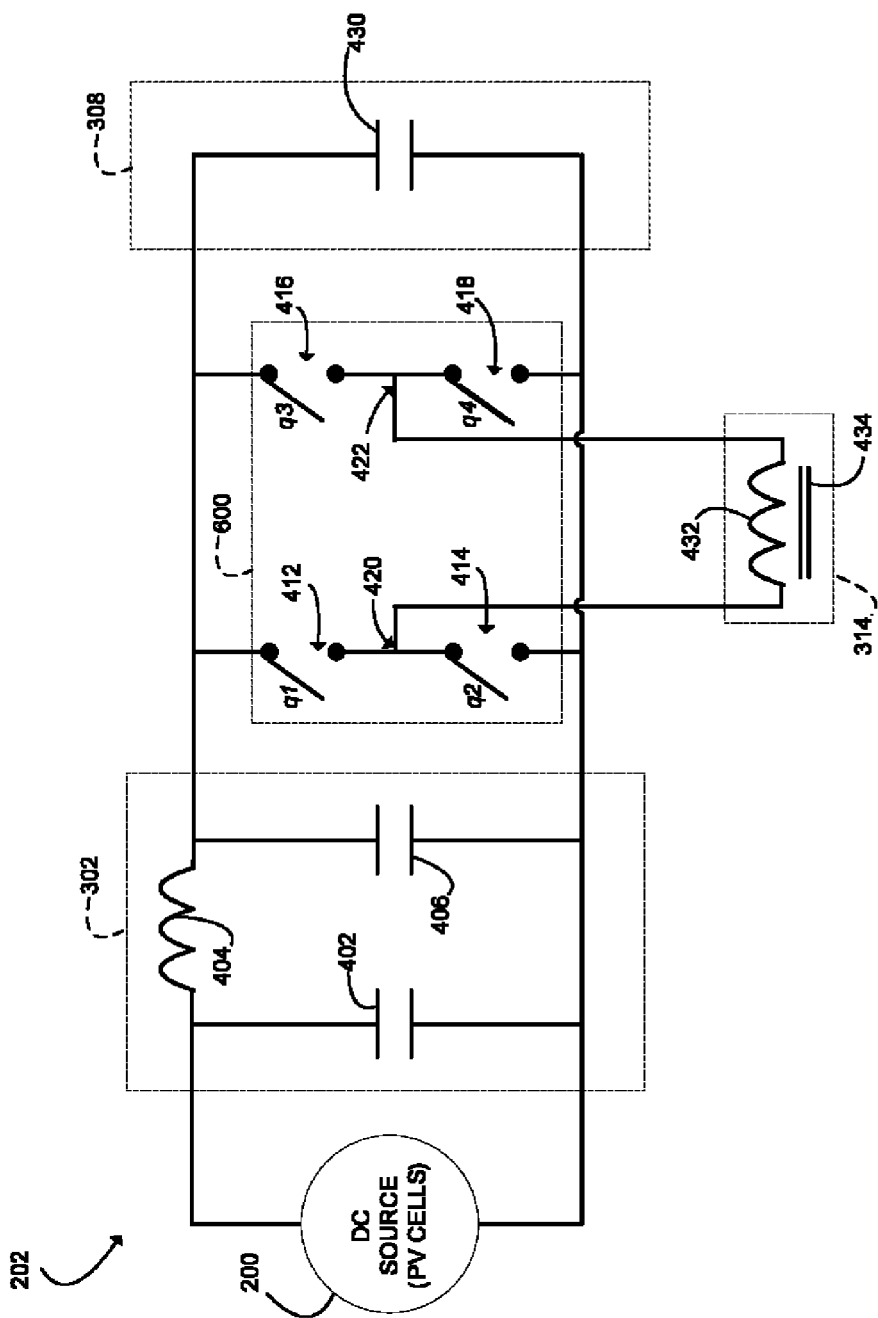
FIG. 6 is a simplified electrical schematic of the input converter of FIG. 4 configured to another circuit topology.

Alternatively, when the circuit topology switch 304 (i.e., semiconductor switch 408 in FIG. 4) is in the on state (i.e., closed), the semiconductor switches 412, 414, 416, and 418 are configured as a full bridge inverter circuit 600 as shown in FIG. 6 to provide an AC power signal to the transformer primary 314. In such a circuit topology, the transformer primary 314 generates an electromagnetic field that may be received by a secondary coil to inductively couple the transformer primary 314 to the secondary coil to generate AC power in the secondary coil as discussed in more detail below.

Figure 7:
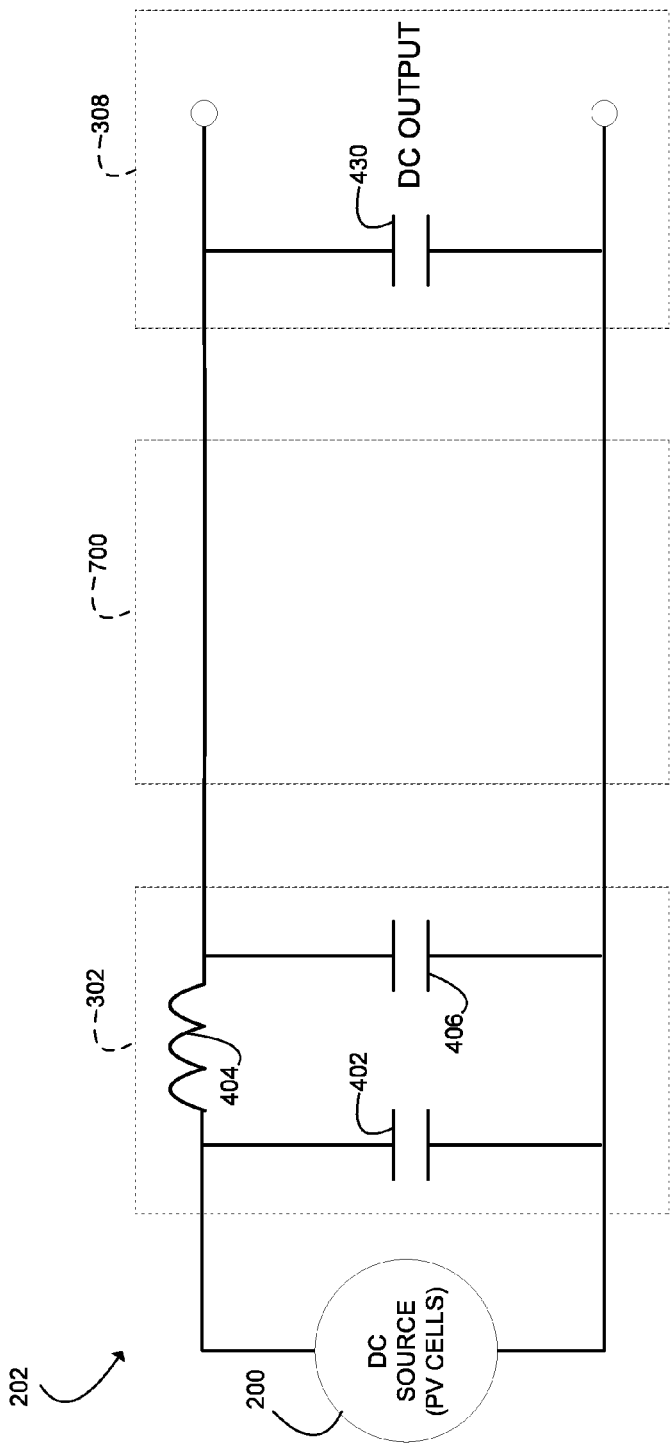
FIG. 7 is a simplified electrical schematic of the input converter of FIG. 4 configured to a further circuit topology.

Additionally, when the circuit topology switch 304 (i.e., semiconductor switch 408 in FIG. 4) is in the on state and the switches 412, 416 and/or 414, 418 are in the off or open state, the semiconductor switches 410, 412, 414, and 416 are configured as a DC pass-through circuit 700 as shown in FIG. 7 to provide a DC power output with minimal or no processing. That is, in such a circuit topology, the DC power input from the DC source 200 is passed over the H-bridge circuit and supplied to the DC power bus 308 without being boosted or otherwise processed.

Figure 8:
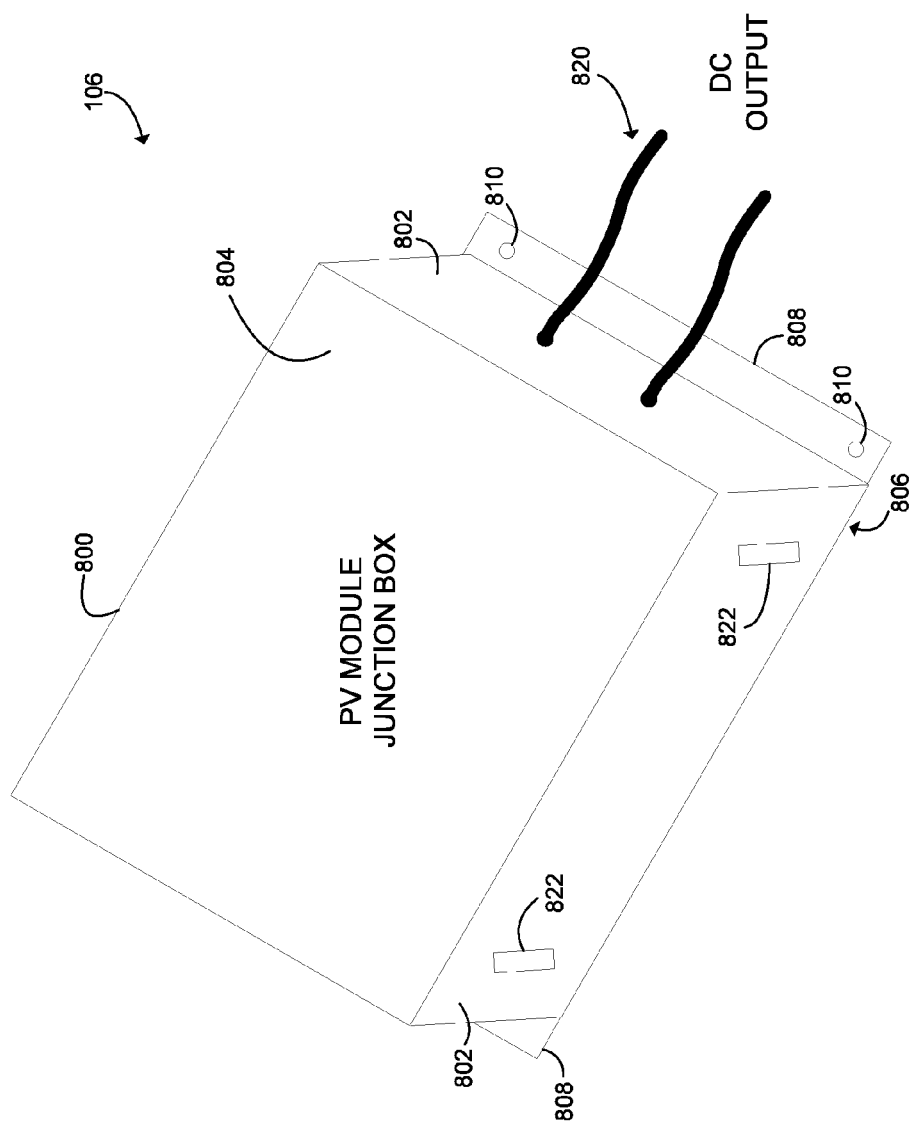
FIG. 8 is a simplified illustration of one embodiment of a PV module junction box of the modular photovoltaic power supply assembly of FIG. 1.

Referring now to FIG. 8, in one embodiment, the junction box 106 includes a power supply housing 800, which houses the configurable power supply circuit 110. The power supply housing 800 illustratively includes a plurality of sidewalls 802, a top or upper wall 804, and a bottom wall 806. In some embodiments, the power supply housing 800 may also include a plurality mounting flanges 808 extending outwardly from the bottom wall 806 to facilitate the attachment or securing of the power supply housing 800 to the rear side 108 of the housing 104 of the PV module 102. To do so, the mounting flanges 808 may include a plurality of mounting holes 810.

As shown in FIG. 8, in some embodiments, the DC output of the configurable power supply circuit 110 is embodied as a pair of DC output wires 820, which extend from one of the sidewalls 802 of the power supply housing 800. junction box 106. In such embodiments, the DC e wires 820 may be used to electrically couple multiple modular photovoltaic (PV) power supply assemblies 100 together (e.g., when the configurable power supply circuit 110 is configured in DC "pass through" mode). Alternatively, a DC electronic accessory device 122, such as a DC-to-DC converter, may be electrically coupled to the configurable power supply circuit 110 via the DC output wires 820. The power supply housing 800 may also include one or more attachment connectors 822 for attaching or securing a DC electronic accessory device 122 or an AC electronic accessory device 124 to the junction box 106 as discussed in more detail below.

Figure 9:
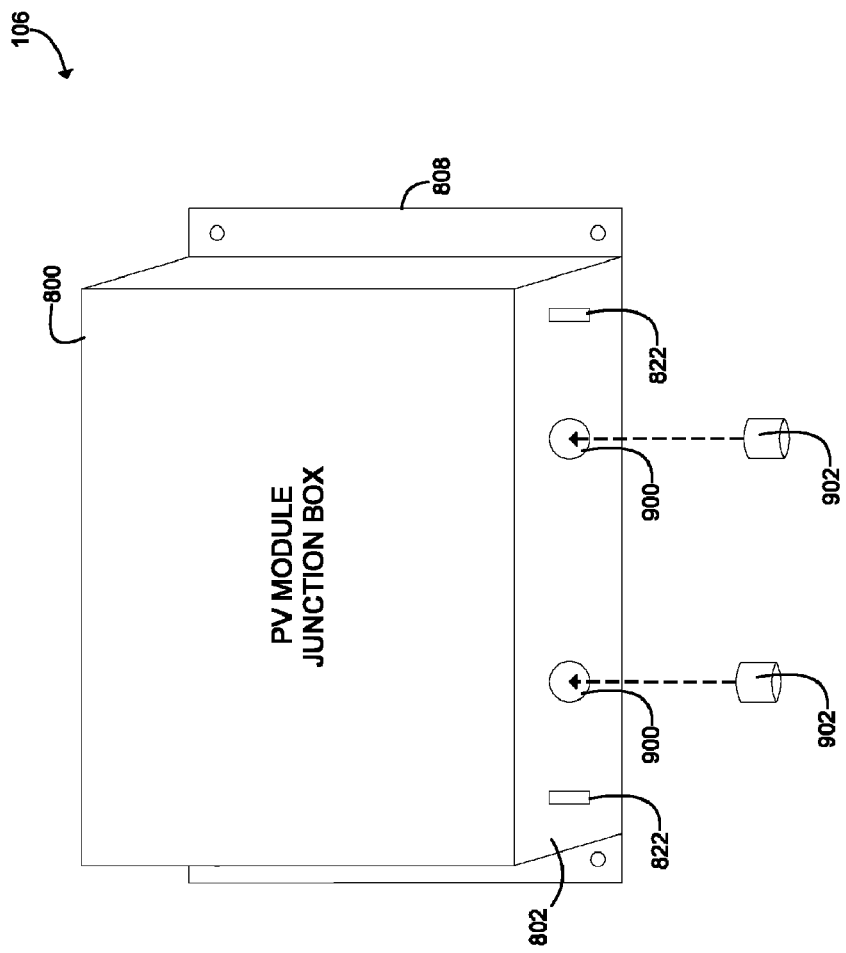
FIG. 9 is a simplified illustration of another embodiment of a PV module junction box of the modular photovoltaic power supply assembly of FIG. 1.

As shown in FIG. 9, the DC output of the configurable power supply circuit 110 may alternatively or additionally be embodied as a pair of DC receptacles 900 secured to or otherwise defined in one of the sidewalls 802 of the power supply housing 800 o f the junction box 106. Of course, in other embodiments, a single dual polarity DC receptacle may be used in place of the pair of signal polarity receptacles 900 illustrated in FIG. 9. The DC receptacles 900 provide an access point to the DC power output of the configurable power supply circuit 110. When not in use, a plug 902 may be inserted into the DC receptacles 900 to environmentally seal the DC receptacles 900 from the surrounding environment. The plugs 902 may be formed from any material capable of being inserted into the DC receptacles 900 and providing a sufficient environmental seal. Alternatively, if the DC receptacles 900 are not to be used, the DC receptacles 900 may simply be sealed using a suitable sealant such as epoxy, silicone, or other non-conductive sealant.

Figure 10:
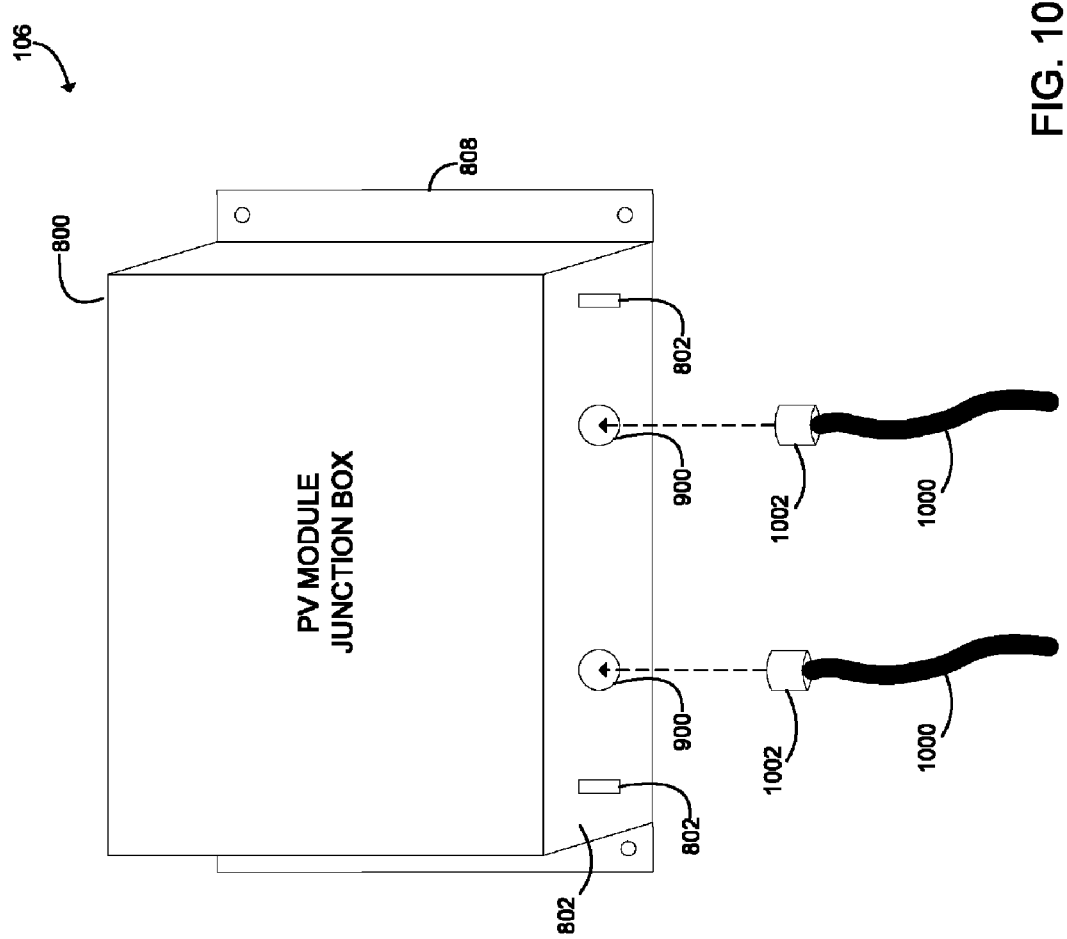
FIG. 10 is a simplified illustration of another embodiment of a PV module junction box of the modular photovoltaic power supply assembly of FIG. 1.

In some embodiments, as shown in FIG. 10, a pair of DC power electrical wires 1000 may be used with the DC receptacles 900. Each DC power wire 1000 includes a plug 1002 located at one end and configured to mate with the corresponding DC receptacle 900. Once mated, the DC power wires 1000 may be used in a manner similar to the DC output wires 820 discussed above in regard to FIG. 8. For example, the DC power wires 1000 may be used to electrically couple multiple modular photovoltaic (PV) power supply assemblies 100 together or couple a DC electronic accessory device 122, such as a DC-to-DC converter, to the configurable power supply circuit 110.

Figure 11:
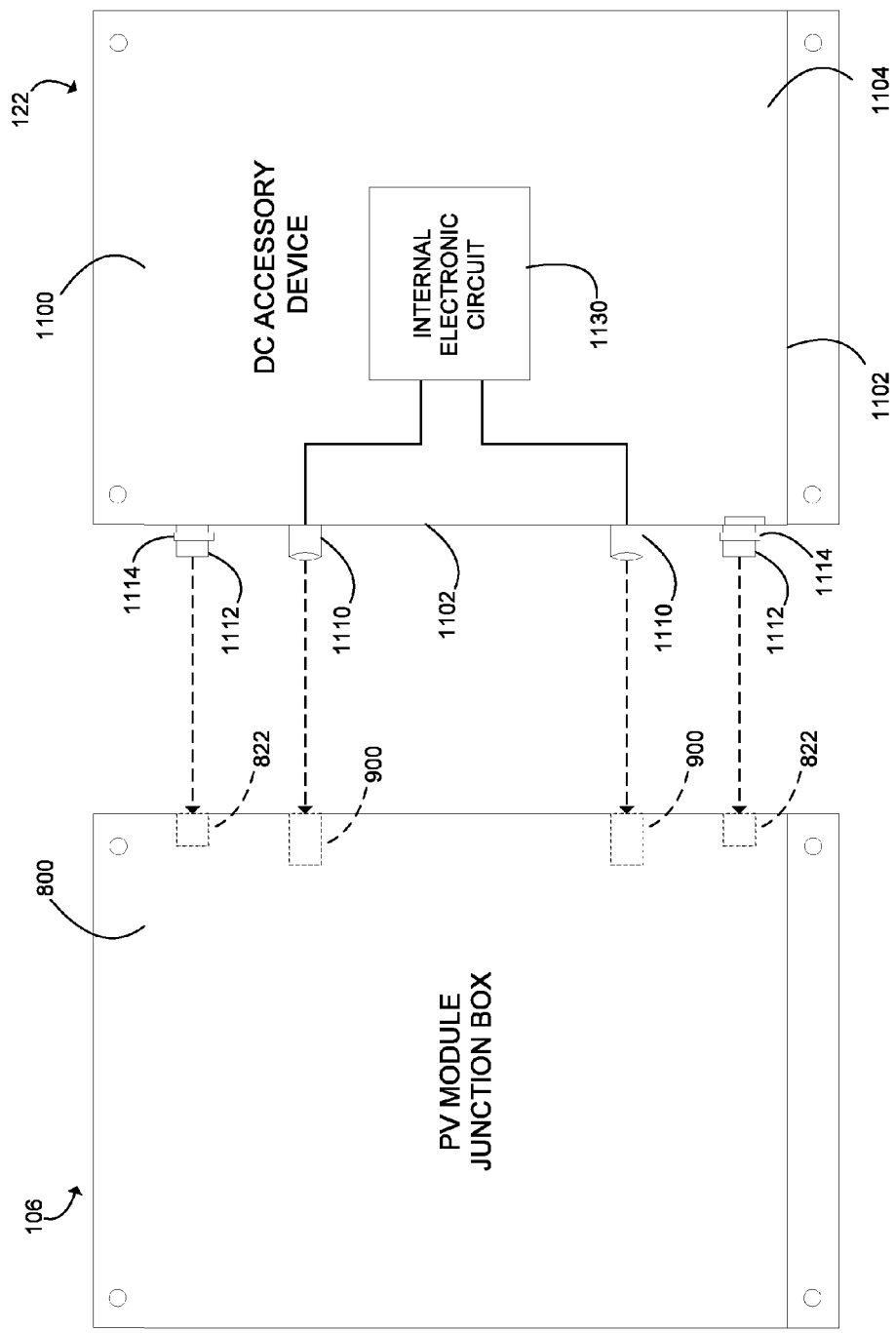
FIG. 11 is a simplified illustration of one embodiment of a DC electronic accessory device of the modular photovoltaic power supply assembly of FIG. 1 being coupled to the PV module junction box of FIG. 9.

In some embodiments, the DC electronic accessory devices 122 may include DC connectors for interconnecting with the DC receptacles 900. For example, as illustrated in FIG. 11, the DC electronic accessory device 122 may include an accessory housing 1100 having a plurality of sidewalls 1102 and an upper or top wall 1104. A pair of DC connectors 1110 may extend from one of the sidewalls 1102 of the accessory housing 1100. The DC connectors 1110 are sized and position to be received in the corresponding DC receptacles 900 of the power supply housing 800. Additionally, the accessory housing 1110 may include one or more attachment connectors 1112 sized and position to be received in the attachment connectors 822 of the power supply housing 800 to secure the DC electronic accessory device 122 to the junction box 106 as discussed above. The attachment connectors 1112 and/or the attachment connectors 822 may include suitable securing structures 1114 to secure the DC electronic accessory device 122 to the junction box 106 such as springs, clips, catch-pins, and/or the other securing devices. After the DC electronic accessory device 122 has been secured to the junction box 106, the DC output of the junction box 106 is supplied to an internal electronic circuit 1130 of the DC electronic accessory device 122 via the interface between the DC receptacles 900 and the DC connectors 1110. As discussed above, the internal electronic circuit 1130 may be embodied as or otherwise include a low voltage DC-to-DC power converter, a high voltage DC-to-DC power converter, a DC power optimizer, or the like.

Figure 12:
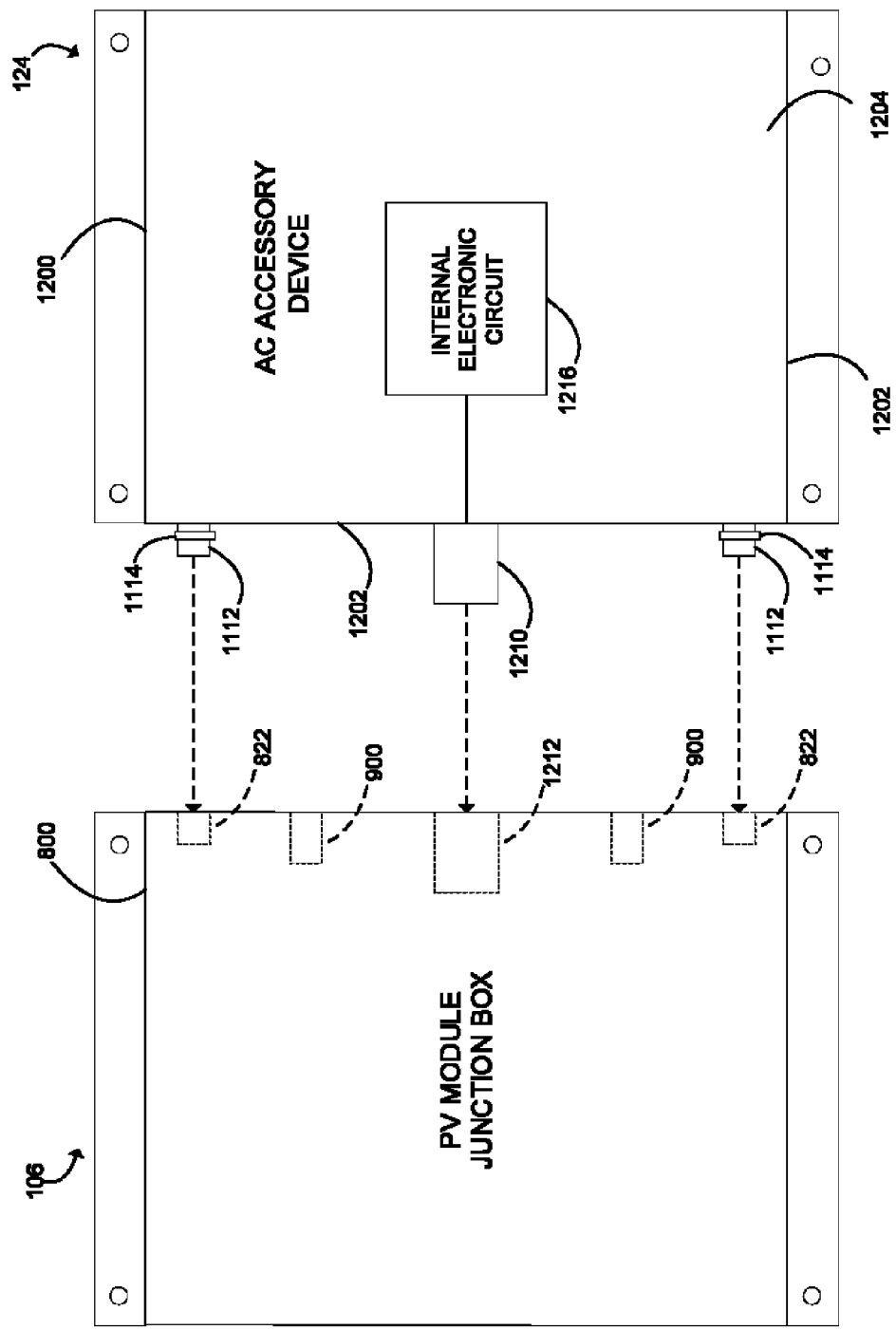
FIG. 12 is a simplified illustration of one embodiment of a PV module junction box and an AC electronic accessory device of the modular photovoltaic power supply assembly of FIG. 1.

Referring now to FIG. 12, in some embodiments, the AC electronic accessory device 124 may also be configured to connect to the power supply housing 800 of the PV module junction box 106. Similar to the DC electronic accessory device 122, the AC electronic accessory device 124 may include an accessory housing 1200 having a plurality of sidewalls 1202 and an upper or top wall 1204. The accessory housing 1200 includes the one or more attachment connectors 1112 sized and position to be received in the attachment connectors 822 of the power supply housing 800 to secure the AC electronic accessory device 124 to the junction box 106 as discussed above. Again, the attachment connectors 1112 and/or the attachment connectors 822 may include suitable securing structures 1114 to secure the AC electronic accessory device 124 to the junction box 106 such as springs, clips, catch-pins, and/or the other securing devices.

Additionally, the accessory housing 1200 includes an inductive coupling connector 1210 extending from one of the sidewalls 1202 of the accessory housing 1200. In such embodiments, the inductive coupling connector 1210 is sized and positioned to be received in a corresponding inductive coupling receptacle 1212 of the power supply housing 800 of the junction box 106. As discussed in more detail below, the inductive coupling connector 1210 includes an internal chamber 1214 in which a secondary coil, or a portion thereof, of an internal electronic circuit 1216 of the AC electronic accessory device is positioned. The secondary coil inductively couples with the transformer primary 314 of the configurable power supply circuit 110 when the inductive coupling connector 1210 is received in the inductive coupling receptacle 1212. In the illustrative embodiment, each of the inductive coupling connector 1210 and the inductive coupling receptacle 1212 has a substantially rectangular cross-section. The cross-sectional area of the inductive coupling receptacle 1212 may be slightly larger than the cross-sectional area of the inductive coupling connector 1210 to allow the male inductive coupling connector 1210 to be received in the female inductive coupling receptacle 1212.

Figure 13:
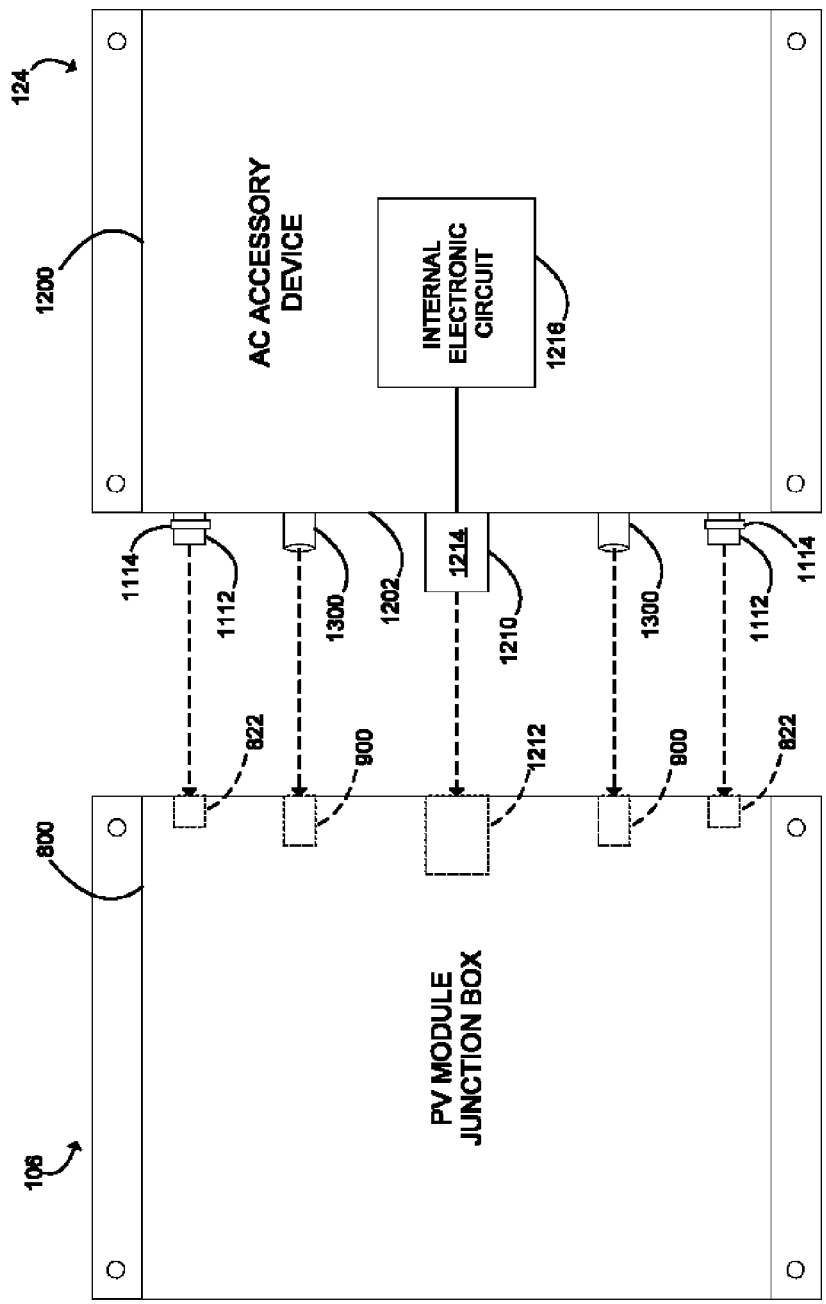
FIG. 13 is a simplified illustration of another embodiment of a PV module junction box and an AC electronic accessory device of the modular photovoltaic power supply assembly of FIG. 1.

Additionally, in some embodiments, as illustrated in FIG. 13, the accessory housing 1200 of the AC electronic accessory device 124 may also include one or more DC plugs 1300 extending from the sidewall 1202 of the accessory housing 1200. The DC plugs 1300 are sized and positioned to be received in the DC receptacles 900 when the AC electronic accessory device 124 is coupled to the junction box 106. When so received, the DC plugs 1300 environmentally seal the DC receptacles 900. The DC plugs 1300 may be formed from any suitable material capable of sealing the DC receptacles 900 such as a polymer, rubber, or plastic material.

Figure 14:
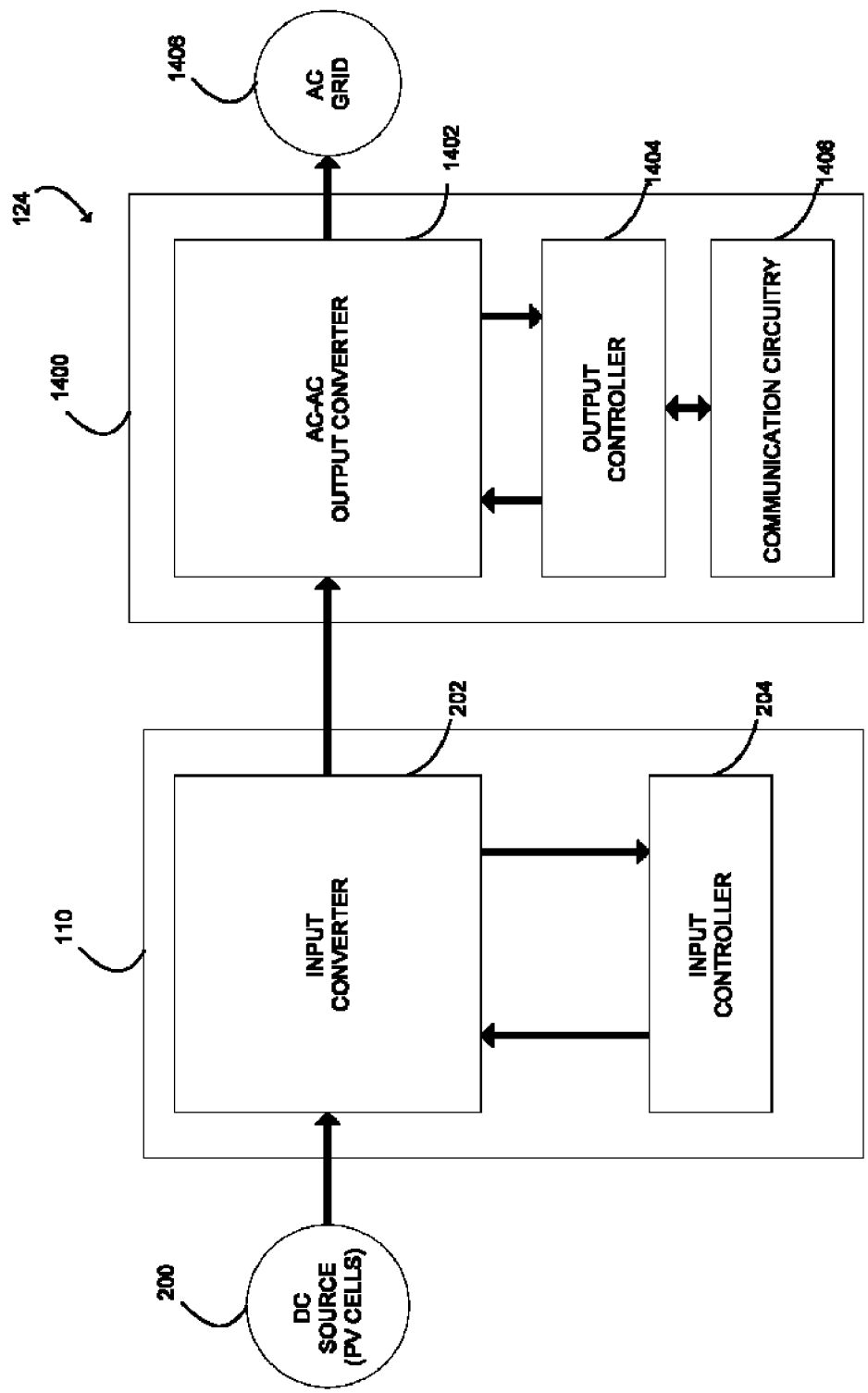
FIG. 14 is a simplified block diagram of the configurable power supply and an AC electronic accessory device of the modular photovoltaic power supply assembly of FIG. 1.

Referring now to FIG. 14, in one embodiment, the AC electronic accessory device 124 is configured as an AC-to-AC converter 1400. As such, when the AC-to-AC converter 1400 is coupled to the configurable power supply 110, the converter 1400 and the configurable power supply 110 form a DC-to-AC inverter. The converter 1400 includes an output converter 1402 and an output controller 1404. The output controller 1404 is electrically coupled to the output converter 1402 and configured to control the operation of the output converter 1202 to convert an AC waveform induced by the input converter 202 to an output AC waveform suitable for delivery to an AC grid 1406. For example, the output controller 1404 may be configured to use a pulse width modulation algorithm to control the output converter 1402 such that the output AC waveform is pulse width modulated. To do so, the output controller 1404 may provide a plurality of switching and/or control signals to various circuits of the output converter 1402 as described in more detail below.

Additionally, in some embodiments, the converter 1400 may include communication circuitry 1408. The communication circuitry 1408 may be communicatively coupled to the output controller 1404 or may be incorporated therein in some embodiments. The output controller 1404 may utilize the communication circuitry 1408 to communicate with remote devices, such as remote controllers or servers. In one particular embodiment, the communication circuitry 1408 is embodied as a power line communication circuit configured to communicate with remote devices over an AC power line, such as the AC power line interconnects coupled to the output of the output converter 1402. However, in other embodiments, other communication technologies and/or protocols may be used. For example, in some embodiments, the communication circuitry 1408 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

Figure 15:
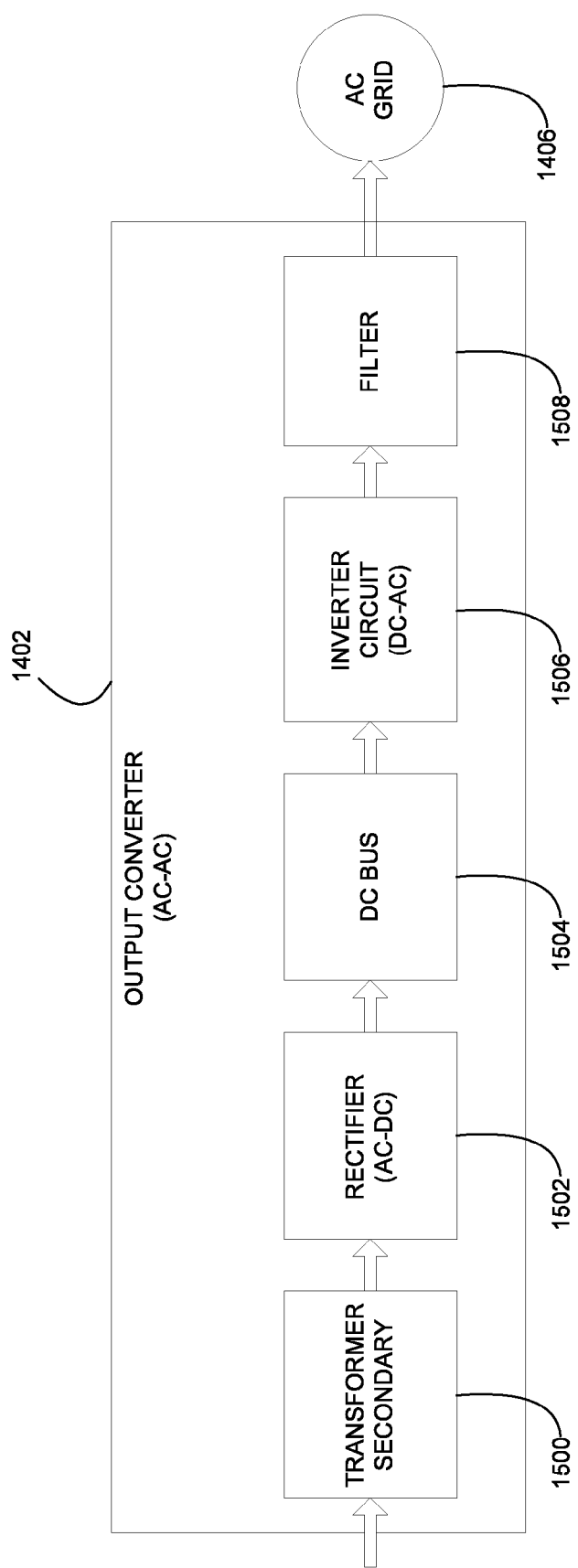
FIG. 15 is a simplified block diagram of one embodiment of an AC electronic accessory device of the modular photovoltaic power supply assembly of FIG. 1.

Referring now to FIG. 15, one embodiment of an output converter 1402 that may be inductively coupled to the input converter 202 of the configurable power supply circuit 110 is shown. The output converter 1402 includes a transformer secondary 1500, which is configured to inductively couple with the transformer primary 314 of the input converter 202 when the AC electronic accessory device 124 is coupled to the junction box 106 as discussed in more detail below. When so coupled, the transformer secondary coil 1500 generates an AC power signal which is rectified by a rectifier circuit 1502 of the output converter 1402. The rectifier circuit 1502 is configured to rectify the AC waveform to a DC waveform, which is supplied to a DC power bus 1504 of the output converter 1402. As discussed below, the DC power bus 1504 may be embodied as one or more capacitors configured to store and release energy. The output converter 1402 also includes an inverter circuit 1506, which is electrically coupled to the DC power bus 1504. The inverter circuit 1506 is configured to convert the DC bus power waveform to an output AC waveform, which is filtered by a filter 1508 prior to being supplied to the AC grid 1406.

Figure 16:
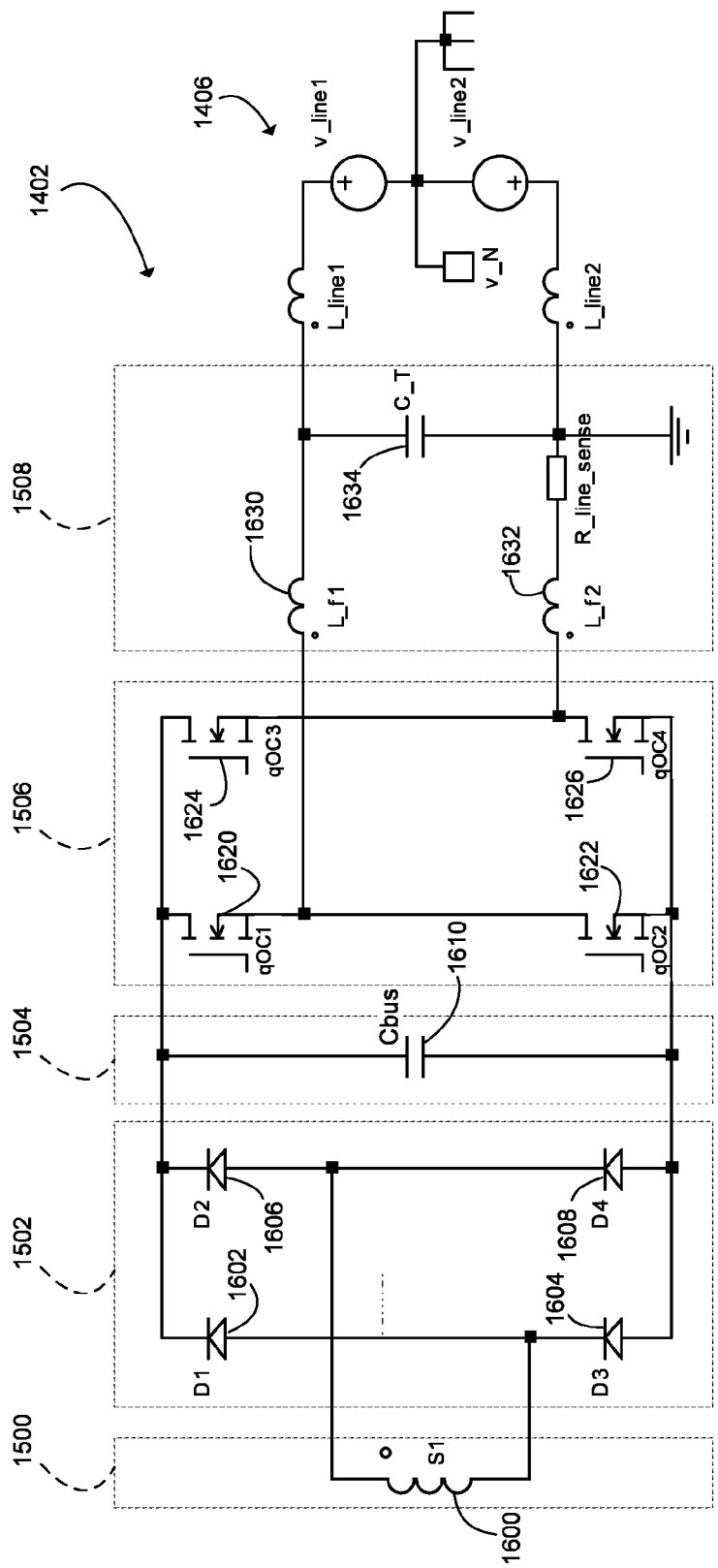
FIG. 16 is a simplified schematic of one embodiment of the AC electronic accessory device of FIG. 15.

One embodiment of the output converter 1402 is schematically illustrated in FIG. 16. The transformer secondary 1500 is embodied as a secondary coil 1600. The secondary coil 1500 includes a plurality of coil turns based on the desired voltage level of the AC output of the output converter 1502. In addition, it should be appreciated that the use of the primary coil 1704 and secondary coil 1600 provides an amount of isolation between the configurable power supply circuit 110 and the output converter 1402. The rectifier circuit 1502 is electrically coupled to the secondary coil 1600 and is configured to convert the AC waveform generated in the secondary coil 1600 to a DC bus waveform supplied to the DC power bus 1504. In the illustrative embodiment, the rectifier circuit 1502 is embodied as a full-bridge rectifier formed from a plurality of diodes 1602, 1604, 1606, 1608. Again, in other embodiments, other circuit topologies may be used in the rectifier circuit 1502.

The DC power bus 1504 is also shown in FIG. 16. The DC power bus 1504 illustratively includes a bus capacitor 1610, which may be embodied as one or more individual capacitive devices. For example, the bus capacitor 1610 may be embodied as one or more film capacitors, electrolytic capacitors, or other capacitive devices. Additionally, in the illustrative embodiment, the power bus 1504 is a DC power bus and receives the DC bus waveform from the rectifier circuit 1502.

The inverter circuit 1506 is illustrative embodied as a bridge circuit formed by a plurality of switches 1620, 1622, 1624, 1626. Each of the switches 1620, 1622, 1624, 1626 are configured to receive a corresponding control signal, $q_{OC1}$, $q_{OC2}$, $q_{OC3}$, $q_{OC4}$, from the output controller 1404 to control operation of the inverter circuit 1306. The output controller 1404 may use PWM to control the switches 1620, 1622, 1624, 1626 to generate a pulse width modulated AC waveform. Of course, it should be appreciated that although the illustrative inverter circuit 1506 is a embodied as a full-bridge circuit, other circuit topologies such as a half-bridge circuit may be used in other embodiments.

The filter 1508 is configured to filter the output voltage by reducing the conducted interference, reducing current ripple, and satisfying regulatory requirements. In the illustrative embodiment, the filter 1508 includes differential-mode inductors 1630, 1632 and a line filter capacitor 1634.

Figure 17:
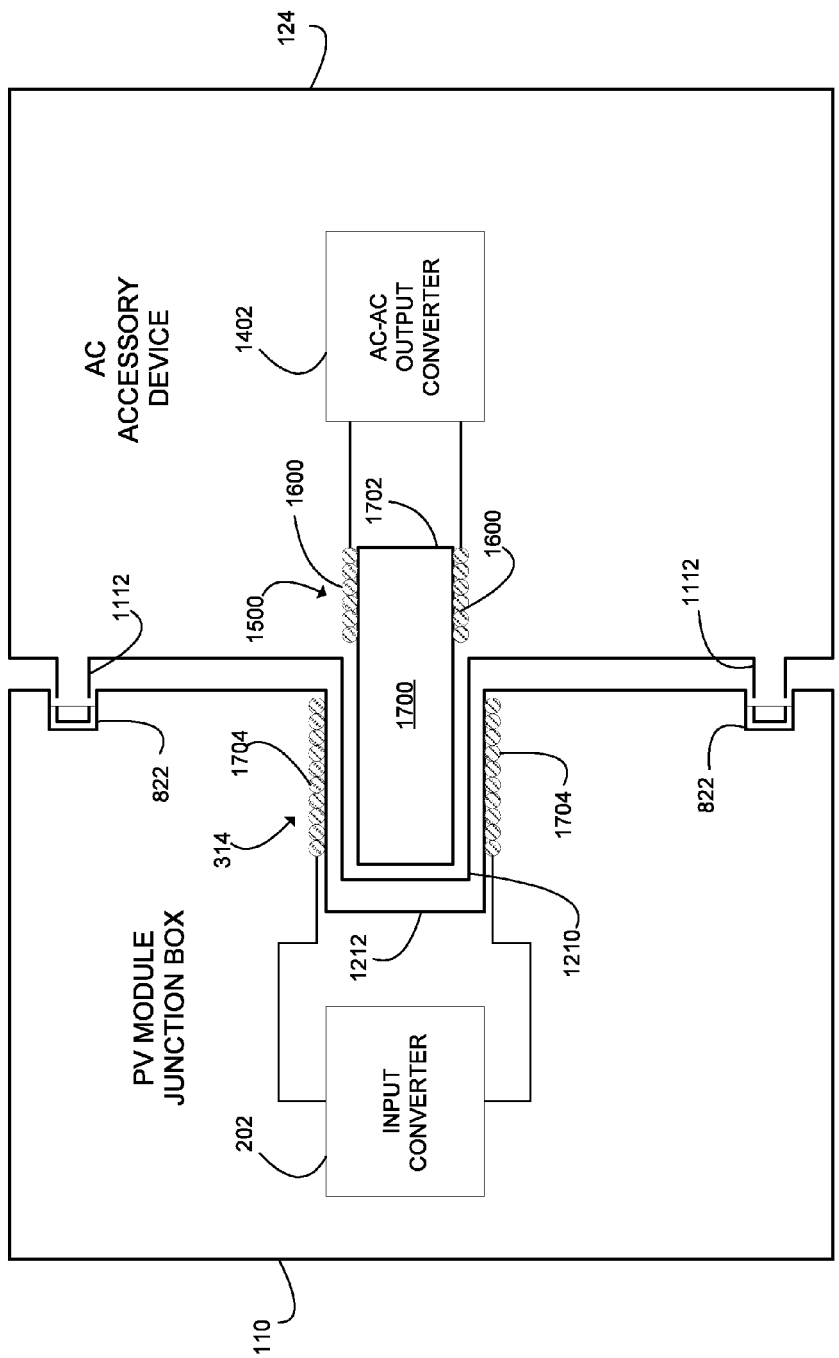
FIG. 17 is a simplified block diagram of one embodiment of the PV module junction box and an AC electronic accessory device of the modular photovoltaic power supply assembly of FIG. 1 having corresponding inductive coupling connectors.

Referring now to FIG. 17, as discussed above, the transformer secondary 1500 of the output converter 1402 is configured to inductively couple with the transformer primary 314 of the input converter 202 when the AC electronic accessory device 124 is connected to the PV module junction box 106. To do so, the AC electronic accessory device 124 may include an inductive coupling connector 1210, which is sized and positioned to be received in a corresponding inductive coupling receptacle 1212 of the junction box 106. As discussed above, the inductive coupling connector 1210 includes an internal chamber 1214 in which an end of a transformer core 1700 is positioned. The secondary coil 1600 of the transformer secondary 1500 is wound around an internal end 1702 of the transformer core 1700 extending from the internal chamber 1214. Of course, in some embodiments the secondary coil 1600, or a portion thereof, may also be located in the internal chamber 1214. As discussed above, the transformer secondary 1500 is electrically connected to rectifier circuit 1502 of the output converter 1402.

Similarly, a primary coil 1704 of the transformer primary 314 is wound around a plurality of sidewalls the form the inductive coupling receptacle 1202. The primary coil 1704 is electrically coupled to other circuitry of the input converter 202 as discussed above. Such positioning of the primary coil 1704 allows the primary coil 1704 and the secondary 1600 to inductively couple when the inductive coupling connector 1210 is received in the corresponding inductive coupling receptacle 1212 even though the configurable power supply circuit 110 and the internal electronic circuit 1204 are physically isolated form each other via the housings 800, 1200. Such inductive coupling allows the input converter 202 to transfer energy to the output converter 1402 via the coils 1704, 1600. Of course, it should be appreciated that the inductive coupling connector 1210 and the inductive coupling receptacle 1212 may be embodied as different connectors and receptacle in other embodiments. Additionally, it should be appreciated that in some embodiments, the AC electronic accessory device 124 may not include the transformer core 1700. In such embodiments, the AC electronic accessory device 124 may also not include the inductive coupling connector 1210 and the PV module junction box 106 may not include the corresponding inductive coupling receptacle 1212. In such embodiments, the primary coil 1704 and the secondary 1600 may be configured to inductively couple across a substantially planar interface (i.e., the interfacing walls of the AC electronic accessory device 124 and the PV module junction box 106 may be void of the inductive coupling connector 1210 and the inductive coupling receptacle 1212).

Figure 18:
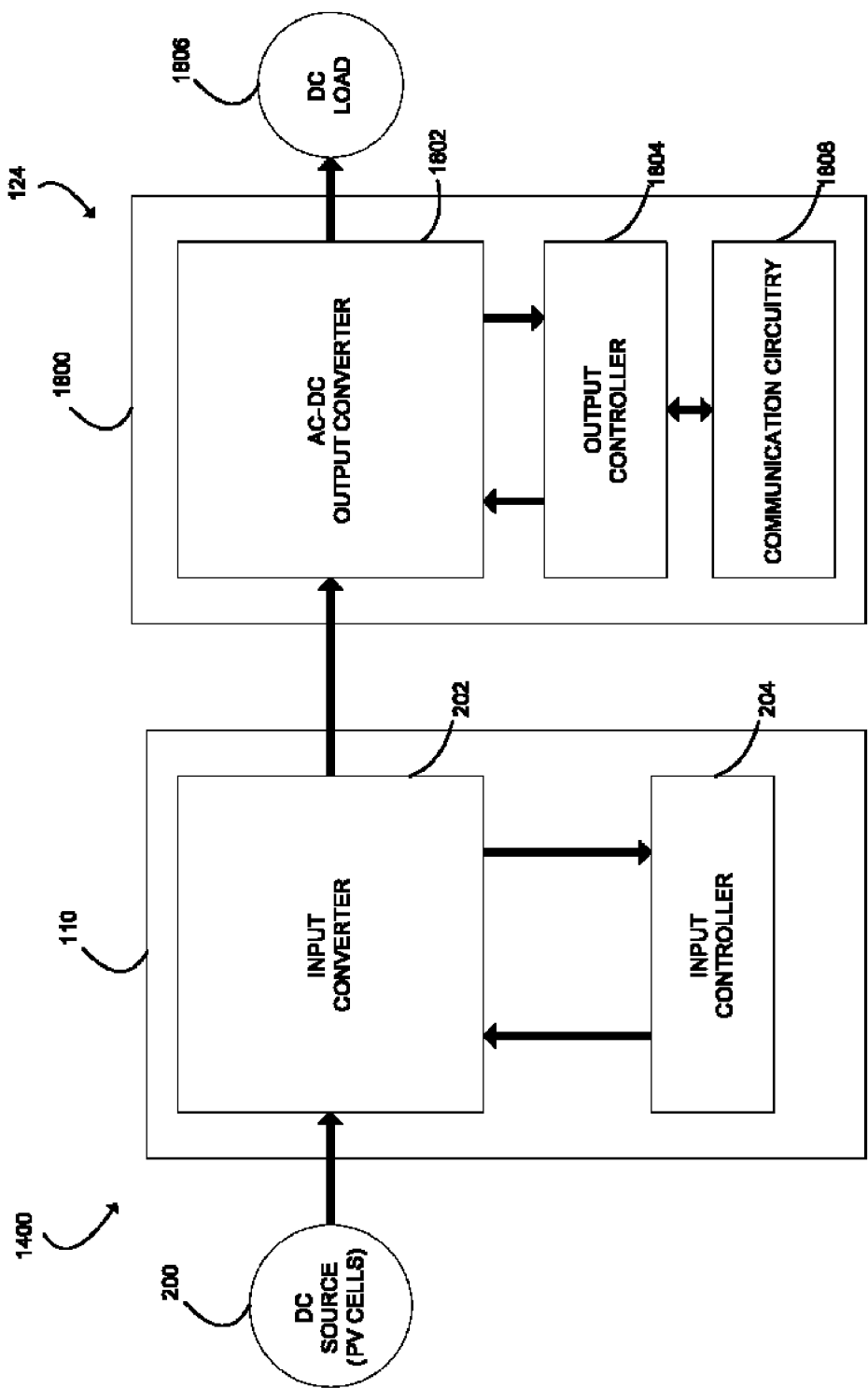
FIG. 18 is a simplified block diagram of another embodiment of an AC electronic accessory device couplable to the configurable power supply of the modular photovoltaic power supply assembly of FIG. 1.

It should be appreciated that in some embodiments, the AC electronic accessory device 124 may be configured to generate a DC power output. For example, as illustrated in FIG. 18, the AC electronic accessory device 124 may be embodied as an AC-to-DC converter 1800. Similar to the converter 1400, the converter 1800 includes an output converter 19802 and an output controller 1804. The output controller 1804 is electrically coupled to the output converter 1802 and configured to control the operation of the output converter 1802 to convert an AC waveform induced by the input converter 202 to a DC power output for delivery to a DC load 1806.

Additionally, similar to the converter 1400, the converter 1800 may include communication circuitry 1808 in some embodiments. The communication circuitry 1808 may be communicatively coupled to the output controller 1804 or may be incorporated therein in some embodiments. The output controller 1804 may utilize the communication circuitry 1808 to communicate with remote devices, such as remote controllers or servers. For example, the communication circuitry 1808 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

Figure 19:
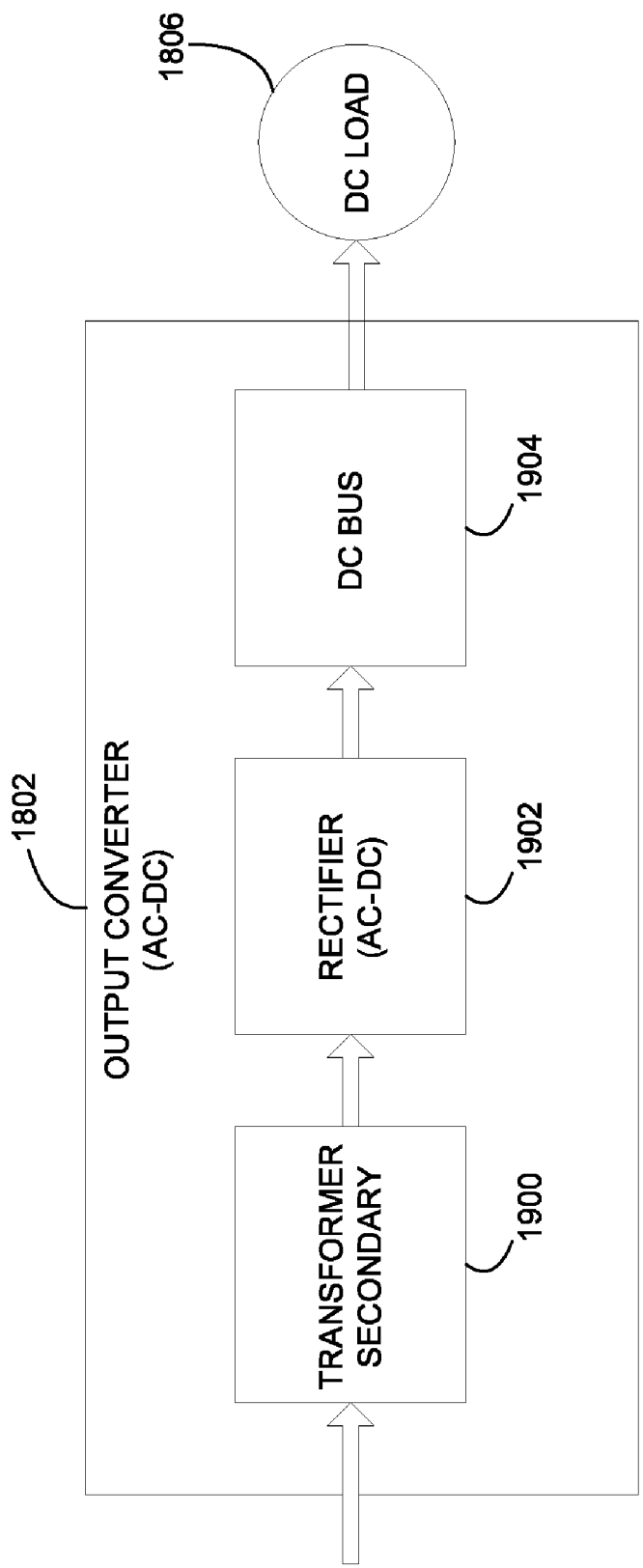
FIG. 19 is a simplified block diagram of one embodiment of the AC electronic accessory device of the FIG. 18.

On illustrative embodiment of a AC-to-DC converter 1802 that may be inductively coupled to the input converter 202 of the configurable power supply circuit 110 is illustrated in FIG. 19. The output converter 1802 includes a transformer secondary 1900, which is configured to inductively couple with the transformer primary 314 of the input converter 202 when the AC electronic accessory device 124 is coupled to the junction box 106 as discussed above. When so coupled, the transformer secondary coil 1900 generates an AC power signal which is rectified by a rectifier circuit 1902 of the output converter 1802. The rectifier circuit 1902 is configured to rectify the AC waveform to a DC waveform, which is supplied to a DC power bus 1904 of the output converter 1402. Similar to the DC power bus 1504, the DC power bus 1804 may be embodied as one or more capacitors configured to store and release energy.

Figure 20:
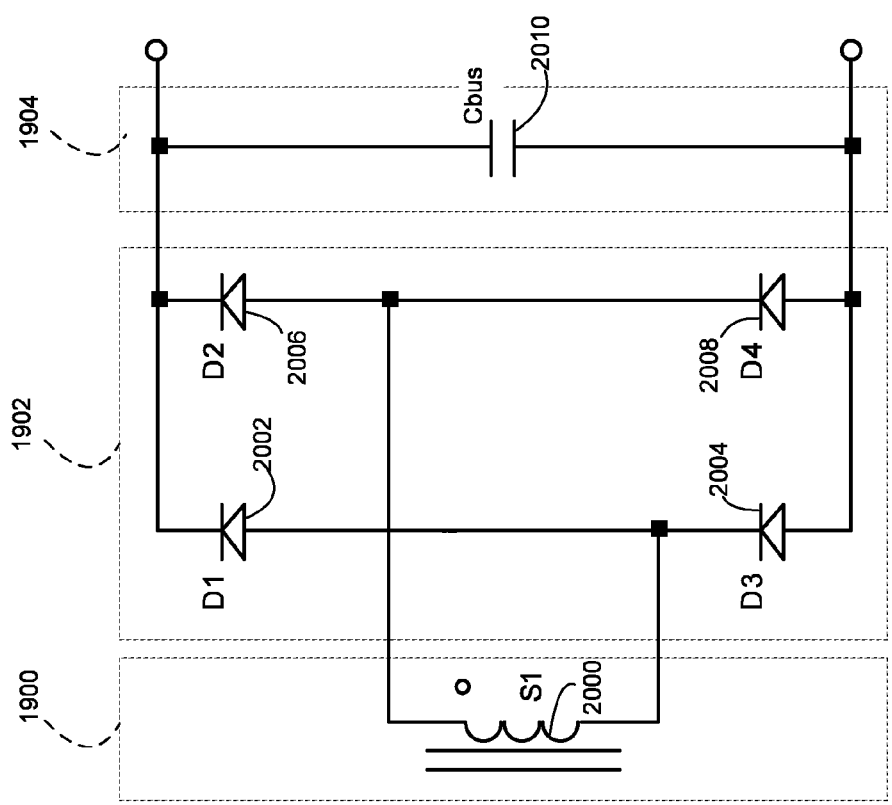
FIG. 20 is a simplified schematic of one embodiment of the AC electronic accessory device of FIG. 19.

One embodiment of the output converter 1802 is schematically illustrated in FIG. 20. The transformer secondary 1800 is embodied as a secondary coil 2000. The secondary coil 2000 includes a plurality of coil turns based on the desired voltage level of the DC power output of the output converter 1802. That is, the transformer formed from the primary coil 1704 of the configurable power supply 110 and the secondary coil 2000 may be embodied as a step-up transformer (i.e., have a relatively low primary-to-secondary turns ratio) or a step-down transformer (i.e., have a relatively high primary-to-secondary turns ratio). As such, the resultant voltage level of the DC power output of the output converter 1802 can be selected based on the coil turns of the secondary coil. In addition, it should be appreciated that the use of the primary coil 1704 and secondary coil 2000 provides an amount of isolation between the configurable power supply circuit 110 and the output converter 1802.

The rectifier circuit 1902 is electrically coupled to the secondary coil 2000 and is configured to convert the AC waveform generated in the secondary coil 2000 to a DC bus waveform supplied to the DC power bus 2010. In the illustrative embodiment, the rectifier circuit 1902 is embodied as a full-bridge rectifier formed from a plurality of diodes 2002, 2004, 2006, 2008. Again, in other embodiments, other circuit topologies may be used in the rectifier circuit 1902.

The illustrative power bus 1904 includes as a bus capacitor 2010, which may be embodied as one or more individual capacitive devices. For example, similar to the bus capacitor 1610 of the power bus 1504 described above, the bus capacitor 2010 may be embodied as one or more film capacitors, electrolytic capacitors, or other capacitive devices. Additionally, in the illustrative embodiment, the power bus 1904 is a DC power bus and receives a DC bus waveform from the rectifier circuit 1902. The power bus 1904 delivers a DC power output signal to the outputs 2012 of the converter 1802.

Figure 21:
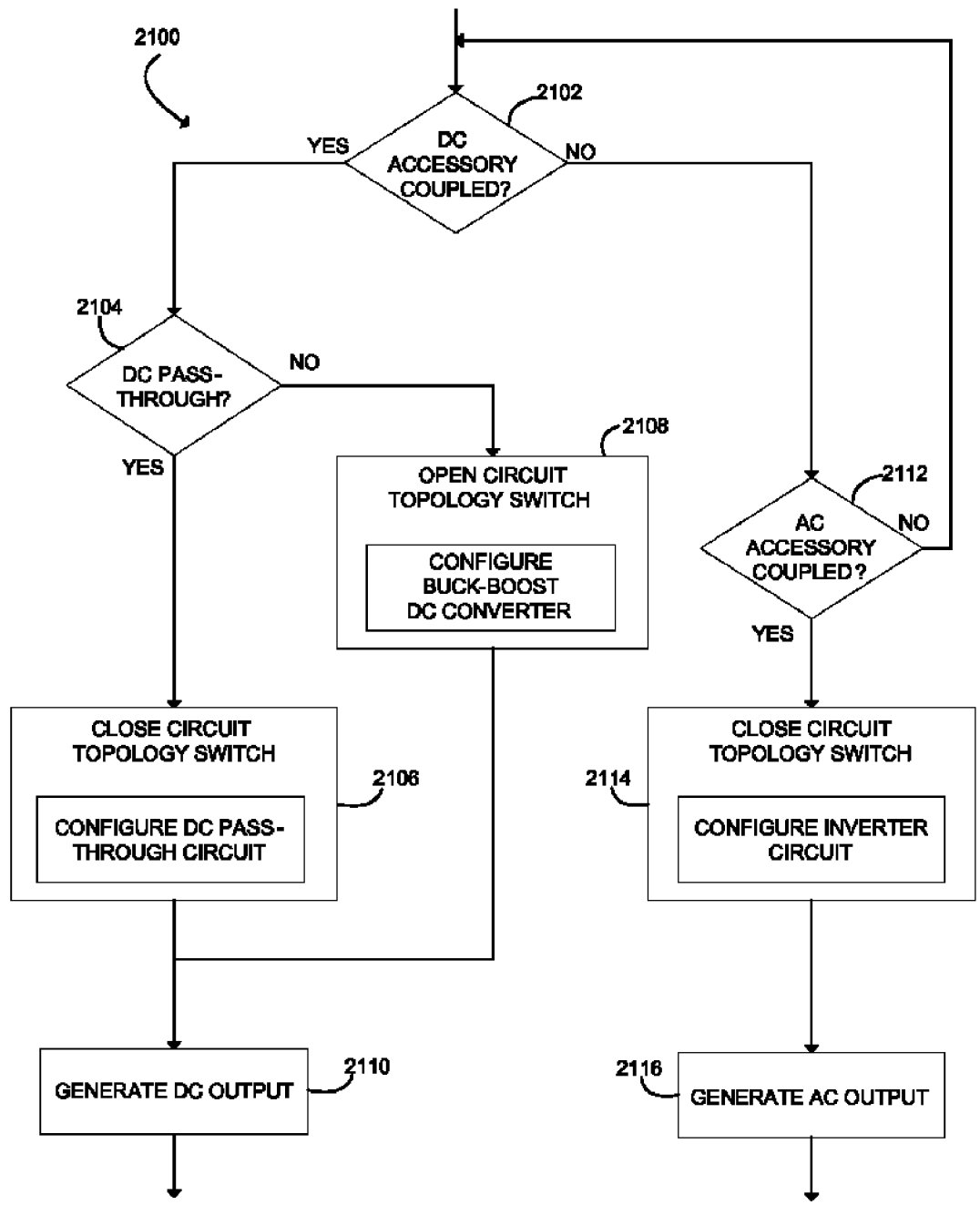
FIG. 21 is a simplified flowchart of one embodiment of a method for controlling a configurable power supply.
Figure 23:
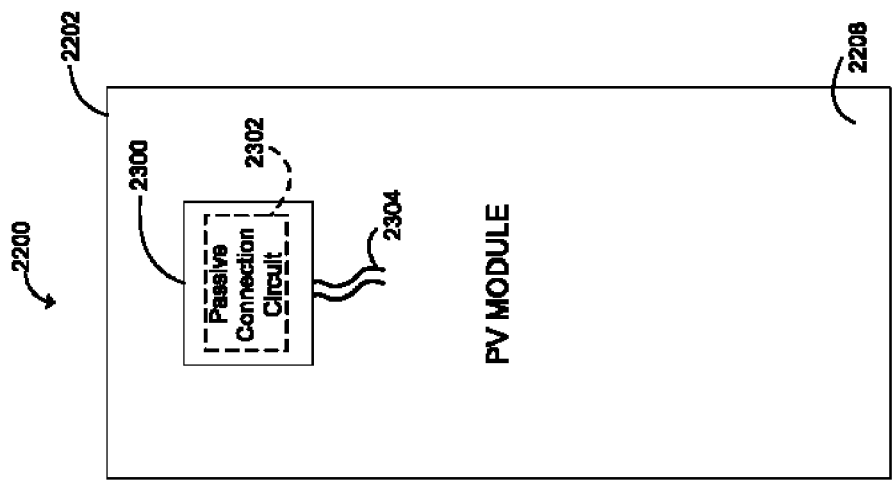
FIG. 23 is a simplified block of a back side of the typical PV module of FIG. 22.
Figure 22:
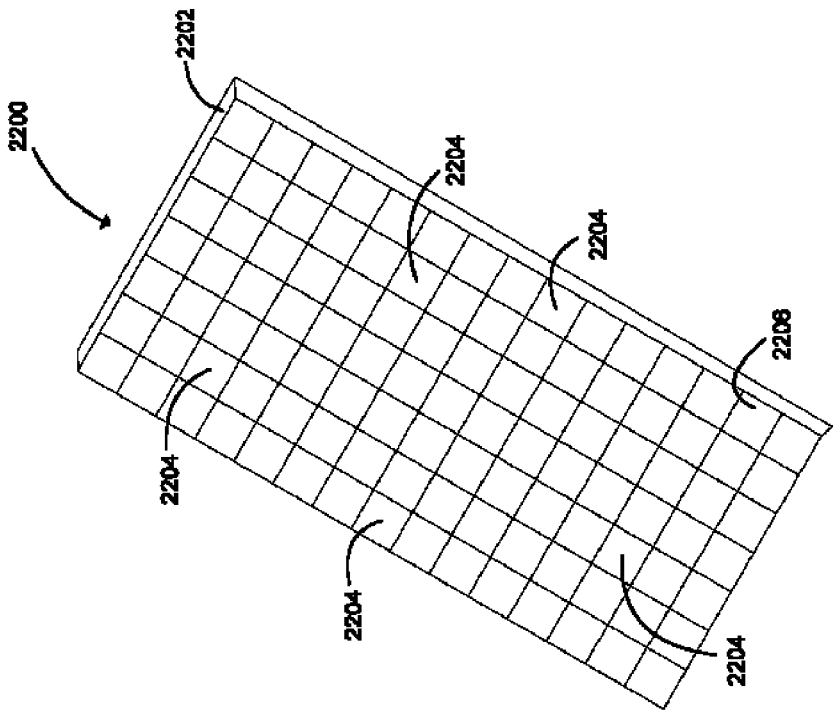
FIG. 22 is a simplified illustration of a typical photovoltaic (PV) module.

Referring now to FIG. 21, in some embodiments, the input controller 204 of the configurable power supply 110 may execute a method 2100 for controlling the input converter 202. The method 2100 begins with block 2102 in which it is determined whether a DC electronic accessory device 122 has been coupled to the PV module junction box 106. The input controller 204 may determine the presence of the DC electronic accessory device 122 based on predetermined information (e.g., a software setting, a physical switch, etc.) or based on sensed signals of the input converter 202 (e.g., based on a sensed DC current output being greater than a predetermined threshold). If the input controller 204 determines that a DC electronic accessory device 122 has been coupled to the PV module junction box 106, the method 2100 advances to block 2104 in which the input controller 204 determines whether DC pass-through has been selected. Again, the input controller 204 may determine the DC pass-through based on predetermined information (e.g., a software setting, a physical switch, etc.) or based on sensed signals of the input converter 202 (e.g., based on a magnitude of a DC output current or on a signal received from the DC electronic accessory device 122).

If the input controller 204 determines that DC pass-through has been selected, the method 2100 advances to block 2106 in which the circuit topology switch 304 is placed in the "on" state. When the switch 304 is closed, the circuit topology of the input converter 202 is modified to a DC pass-through circuit 700 (see FIG. 7) in which the DC output of the DC source 200 is supplied to the DC output of the input converter 202 with minimal or no processing as discussed above.

Referring back to block 2104, if the input controller 204 determines that DC pass-through has not been selected, the method 2100 advances to block 2108 in which the circuit topology switch 304 is opened (i.e., placed in the "off" state). When the switch 304 is opened, the circuit topology of the input converter 202 is modified to a buck-boost converter 500 (see FIG. 5) in which a boosted or otherwise processed DC power output is supplied to the DC output of the input converter 202. Subsequently, in block 1810, the input converter 202 generates the DC output.

Referring back to block 2102, if the input controller 204 determines that a DC electronic accessory device 122 has not been coupled to the PV module junction box 106, the method 2100 advances to block 2112. In block 1812, the input controller 204 determines whether an AC electronic accessory device 124 has been coupled to the PV module junction box 106. The input controller 204 may determine whether the AC electronic accessory device 124 has been coupled to the PV module junction box 106 using any suitable methodology. For example, in some embodiments, the input controller 204 may determine whether a sensed AC output current of an AC output of the configurable power supply circuit 110 is above a predetermined threshold or whether the primary coil 1704 is inductively coupled to the secondary coil 1600, 2000 of the AC electronic accessory device 124. If not, the method 2100 loops back to block 1802. However, if the input controller 204 determines that an AC electronic accessory device 124 has been coupled to the PV module junction box 106 (e.g., based on predetermined data such as a physical switch or based on sensed data such as a sensed current of the transformer primary 314), the method 2100 advances to block 2114. In block 2114, the circuit topology switch 304 is closed (i.e., placed in the "on" state). When the switch 304 is closed, the input converter 202 is configured as a full bridge DC-AC inverter circuit configured to generate an AC waveform across the transformer primary 314. As discussed above, the transformer primary 314 may be inductively coupled with a corresponding transformer secondary 1500, 1900 of an output converter 1402, 1802 to generate an AC power output.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. A method for controlling a photovoltaic power supply assembly a photovoltaic and a configurable power supply electrically coupled to the photovoltaic module, the method comprising:

determining (i) whether a direct current (DC) electric accessory has been electrically connected to the configurable power supply and (ii) whether an alternating current (AC) electric accessory has been inductively coupled to the configurable power supply;

in response to determining that the DC electric accessory has been electrically connected, modifying a circuit topology of the configurable power supply to a first circuit topology to convert a power supply input received from the photovoltaic module to a DC power output to the DC electric accessory, and in response to determining that the AC electric accessory has been inductively coupled to the configurable power supply, modifying the circuit topology of the configurable power supply to a second circuit topology to convert a power supply input received from the photovoltaic module to an AC power output to the AC electric accessory, wherein determining whether the AC electric accessory has been inductively coupled to the configurable power supply comprises determining whether a primary coil of the configurable power supply is inductively coupled to a secondary coil of an internal electronic circuit of the AC electric accessory.

2. The method of claim 1, wherein determining whether the DC electric accessory has been electrically connected to the configurable power supply comprises sensing a DC output current at a DC output of the configurable power supply.

3. The method of claim 1, wherein determining whether the DC electric accessory has been electrically connected to the configurable power supply comprises receiving a control signal indicating that the DC electric accessory has been electrically connected to the configurable power supply.

4. The method of claim 1, wherein determining whether the DC electric accessory has been electrically connected to the configurable power supply comprises determining a state of a physical switch.

5. The method of claim 1, wherein determining whether the AC electric accessory has been inductively coupled to the configurable power supply comprises sensing an AC output current at an AC output of the configurable power supply.

6. The method of claim 1, wherein modifying the circuit topology of the configurable power supply comprises controlling a state of an electronic switch of the configurable power supply.

7. The method of claim 6, wherein modifying the circuit topology of the configurable power supply comprises controlling a state of a plurality of electronic switches of an H-bridge of the configurable power supply.

8. The method of claim 1, wherein:
modifying the circuit topology of the configurable power supply to the first circuit topology comprises modifying the circuit topology of the configurable power supply to form a buck-boost converter, and
modifying the circuit topology of the configurable power supply to the second circuit topology comprises modifying the circuit topology of the configurable power supply to form a DC-AC inverter circuit.

9. The method of claim 8, further comprising modifying the circuit topology to a third circuit topology to form a pass-through circuit to pass a DC power input received by the configurable power supply to a DC output of the configurable power supply with substantially no processing.

10. A photovoltaic configurable power supply comprising:
an input converter having an input to receive a direct current (DC) power input from a photovoltaic module, the input converter being selectively configurable between a first circuit topology to convert a power supply input received from the photovoltaic module to a DC power output and a second circuit topology to convert a power supply input received from the photovoltaic module to an AC power output based on a control signal; and
an input controller electrically connected to the input converter, the input controller comprising a processor and a memory, the memory comprising a plurality of instructions, which when executed by the processor, cause the input controller to:
determine (i) whether a direct current (DC) electric accessory has been electrically connected to the input converter and (ii) whether an alternating current (AC) electric accessory has been inductively coupled to the input converter,
in response to determining that the DC electric accessory has been electrically connected to the input converter, modify the circuit topology of the input converter to the first circuit topology, and
in response to determining that the AC electric accessory has been inductively coupled to the input converter, modify the circuit topology of the input converter to the second circuit topology,
wherein to determine whether the AC electric accessory has been electrically connected to the input converter comprises to determine whether a primary coil of the input converter is inductively coupled to a secondary coil of an internal electronic circuit of the AC electric accessory.

11. The configurable power supply of claim 10, wherein to determine whether the DC electric accessory has been electrically connected to the input converter comprises to determine whether a sensed DC output current of the input converter is above a predetermined threshold value.

12. The configurable power supply of claim 10, wherein to determine whether the DC electric accessory has been electrically connected to the input converter comprises to determine a state of a physical switch.

13. The configurable power supply of claim 10, wherein to determine whether the AC electric accessory has been electrically connected to the input converter comprises to determine whether a sensed AC output current of the input converter is above a predetermined threshold value.

14. The configurable power supply of claim 10, wherein to modify the circuit topology of the input converter comprises to control a state of an electronic switch of the input converter.

15. The configurable power supply of claim 10, wherein:
to modify the circuit topology of the input converter to the first circuit topology comprises to modify the circuit topology of the input converter to form a buck-boost converter, and
to modify the circuit topology of the configurable power supply to the second circuit topology comprises to modify the circuit topology of the input converter to form a DC-AC inverter circuit.

16. The configurable power supply of claim 15, wherein the plurality of instructions, which when executed by the processor, further cause the input controller to modify the circuit topology of the input converter to a third circuit topology to form a pass-through circuit to pass the DC power input to a DC output of the configurable power supply with substantially no processing.

17. A method for controlling a photovoltaic power supply assembly comprising a photovoltaic module and a configurable power supply electrically coupled to the photovoltaic module, the method comprising:

determining (i) whether a direct current (DC) electric accessory has been electrically connected to the configurable power supply and (ii) whether an alternating current (AC) electric accessory has been inductively coupled to the configurable power supply;

in response to determining that the DC electric accessory has been electrically connected, modifying a circuit topology of the configurable power supply to form a buck-boost DC converter to deliver an amount of DC power to the DC electric accessory, in response to determining that the AC electric accessory has been inductively coupled to the configurable power supply, modifying the circuit topology of the configurable power supply to form a DC-AC inverter circuit to deliver an amount of AC power to the AC electric accessory, and in response to determining that the DC electric accessory has been electrically connected, modifying the circuit topology of the configurable power supply to form a DC pass-through circuit based on a state of an electronic switch.

18. The method of claim 17, wherein determining whether the DC electric accessory has been electrically connected to the configurable power supply comprises sensing a DC output current at a DC output of the configurable power supply.

19. The method of claim 17, wherein determining whether the AC electric accessory has been electrically connected to the configurable power supply comprises determining whether a primary coil of the configurable power supply is inductively coupled to a secondary coil of an internal electronic circuit of the AC electric accessory.

20. The method of claim 17, wherein modifying the circuit topology of the configurable power supply comprises controlling a state of at least one electronic switch of an H-bridge of the configurable power supply.

\* \* \* \* \*